(12) United States Patent
Ritter et al.

(10) Patent No.: US 11,560,957 B2
(45) Date of Patent: Jan. 24, 2023

(54) FAUCET WITH IMPROVED VALVE

(71) Applicant: Kohler Co., Kohler, WI (US)

(72) Inventors: David H. Ritter, Kohler, WI (US);
Brian S. Core, Fond du Lac, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 17/708,519

(22) Filed: Mar. 30, 2022

(65) Prior Publication Data

US 2022/0221067 A1   Jul. 14, 2022

Related U.S. Application Data

(63) Continuation of application No. 16/564,316, filed on Sep. 9, 2019, now Pat. No. 11,300,217.

(60) Provisional application No. 62/729,264, filed on Sep. 10, 2018.

(51) Int. Cl.
| *F16K 11/072* | (2006.01) |
| *F16K 11/00* | (2006.01) |
| *F16K 27/00* | (2006.01) |
| *F16K 31/60* | (2006.01) |

(52) U.S. Cl.
CPC .......... *F16K 11/072* (2013.01); *F16K 19/006* (2013.01); *F16K 27/00* (2013.01); *F16K 31/60* (2013.01)

(58) Field of Classification Search
CPC .. F16K 11/072; F16K 11/0782; F16K 27/045; F16K 31/605
See application file for complete search history.

(56) References Cited

U.S. PATENT DOCUMENTS

| 2,589,857 A | | 3/1952 | Pena | |
| 3,667,503 A | * | 6/1972 | Farrell | ................ F16K 11/0655 |
| | | | | 137/625.4 |
| 3,794,074 A | * | 2/1974 | Watts | .................. F16K 11/0782 |
| | | | | 137/625.4 |

(Continued)

FOREIGN PATENT DOCUMENTS

FR   2415769   8/1979

OTHER PUBLICATIONS

Foreign Action other than Search Report on PCT PCT/US2019/050185 dated Mar. 25, 2021.

(Continued)

*Primary Examiner* — Reinaldo Sanchez-Medina
(74) *Attorney, Agent, or Firm* — Foley & Lardner LLP

(57) ABSTRACT

A cartridge valve includes a housing, a stem adapter, and a stem assembly. The stem adapter includes a body defining a first hole, which extends in a longitudinal direction. The stem assembly includes a first stem component and a second stem component. The first stem component includes an arm and a spherical portion that is configured to be at least partially positioned within the first hole and defines an opening. The second stem component has a body that is configured to be at least partially received within the opening of the first stem component. The spherical portion is configured to expand in size in response to the first end inserting a portion of the body of the second stem component into the opening in the first stem component, which increases a frictional resistance induced by relative rotation between the stem assembly and the stem adapter.

20 Claims, 15 Drawing Sheets

(56) References Cited

U.S. PATENT DOCUMENTS

| | | | |
|---|---|---|---|
| 3,938,546 A * | 2/1976 | Farrell | F16K 11/0787 137/454.2 |
| 3,965,935 A * | 6/1976 | Morisseau | F16K 11/0782 137/625.42 |
| 4,153,077 A | 5/1979 | Egli | |
| 4,633,906 A | 1/1987 | Tuchman | |
| 4,887,642 A * | 12/1989 | Bernat | F16K 11/0782 137/625.17 |
| 4,932,433 A | 6/1990 | Knapp | |
| 4,934,408 A | 6/1990 | Christopherson | |
| 4,979,530 A | 12/1990 | Breda | |
| 5,095,934 A | 3/1992 | Iqbal | |
| 5,165,446 A | 11/1992 | Mols et al. | |
| 5,361,431 A | 11/1994 | Freier et al. | |
| 5,375,624 A | 12/1994 | Knapp | |
| 5,477,885 A | 12/1995 | Knapp | |
| 5,507,314 A | 4/1996 | Knapp | |
| 5,615,709 A | 4/1997 | Knapp | |
| 5,664,603 A | 9/1997 | Knapp | |
| 5,740,836 A | 4/1998 | Tang | |
| 5,813,435 A | 9/1998 | Knapp | |
| 5,887,852 A | 3/1999 | Delaisement | |
| 6,131,600 A | 10/2000 | Chang | |
| 6,796,544 B1 | 9/2004 | Chen | |
| 6,907,903 B1 * | 6/2005 | Chang | F16K 31/605 137/636.3 |
| 6,920,899 B2 | 7/2005 | Haenlein et al. | |
| 7,032,272 B2 | 4/2006 | Haenlein | |
| 7,137,410 B2 | 11/2006 | Rosko | |
| 7,628,173 B2 | 12/2009 | Rosko et al. | |
| 7,779,865 B2 | 8/2010 | Shay et al. | |
| 7,806,141 B2 | 10/2010 | Marty et al. | |
| 7,850,098 B2 | 12/2010 | Vogel | |
| 7,909,269 B2 | 3/2011 | Erickson et al. | |
| 8,056,578 B2 | 11/2011 | Lopp et al. | |
| 8,109,293 B2 | 2/2012 | Tucker | |
| 8,215,334 B2 | 7/2012 | Esche et al. | |
| 8,322,377 B2 | 12/2012 | Di Nunzio | |
| 8,763,175 B2 | 7/2014 | Li et al. | |
| 9,228,675 B2 | 1/2016 | Chen | |
| 9,707,574 B2 | 7/2017 | Soetaert et al. | |
| 2006/0016491 A1 * | 1/2006 | Rosko | F16K 11/0787 137/625.4 |
| 2006/0118185 A1 | 6/2006 | Nobili | |
| 2006/0174955 A1 | 8/2006 | Huang | |
| 2007/0039654 A1 | 2/2007 | Pinette | |
| 2008/0178952 A1 | 7/2008 | Kacik et al. | |
| 2009/0108223 A1 | 4/2009 | Deutsch et al. | |
| 2009/0126811 A1 | 5/2009 | Li et al. | |
| 2012/0326063 A1 | 12/2012 | Chen | |
| 2015/0260307 A1 | 9/2015 | Chen | |
| 2016/0177551 A1 | 6/2016 | Li et al. | |
| 2016/0195414 A1 | 7/2016 | Moss et al. | |
| 2016/0333555 A1 | 11/2016 | Liang et al. | |

OTHER PUBLICATIONS

Foreign Search Report on PCT PCT/US2019/050185 dated Jan. 31, 2020.

* cited by examiner

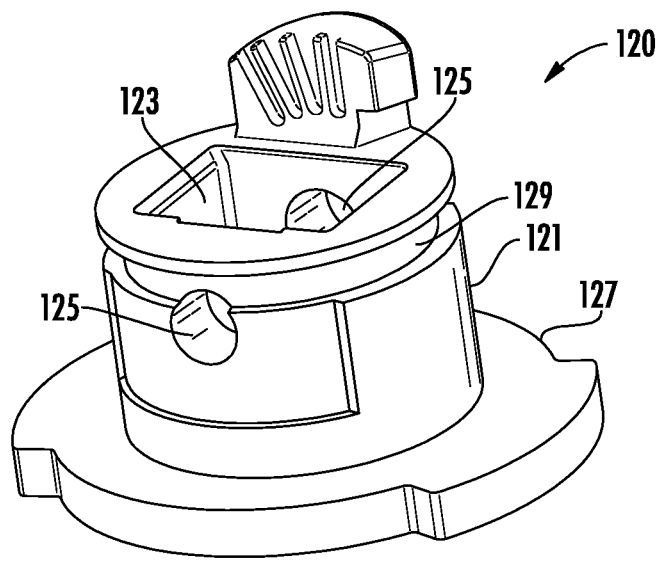
FIG. 8
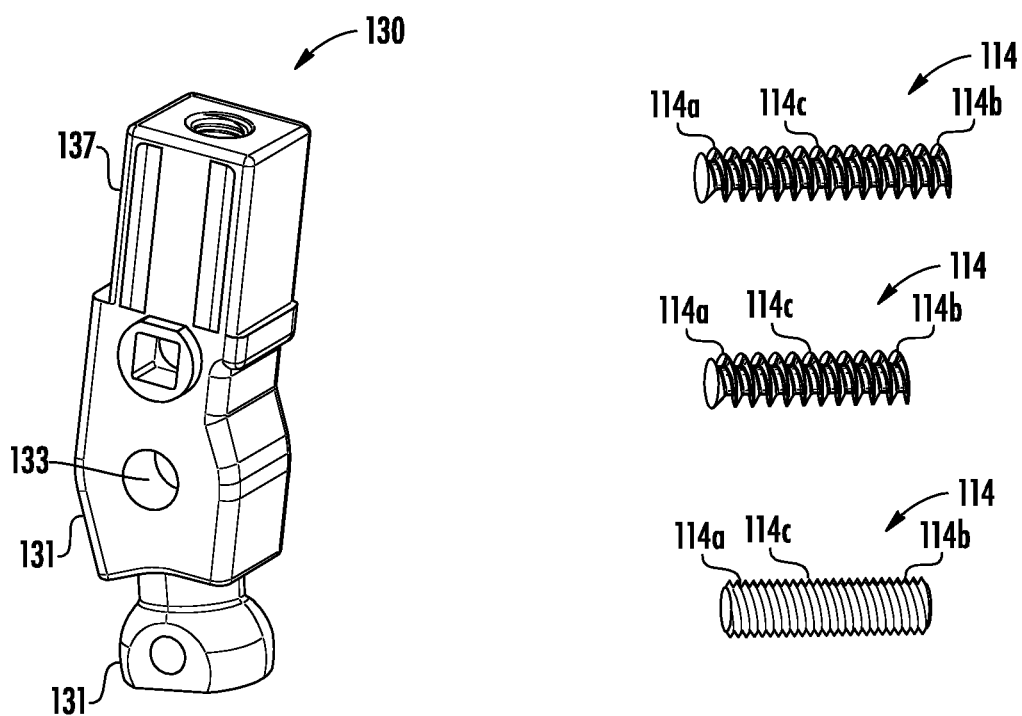
FIG. 9
FIG. 10

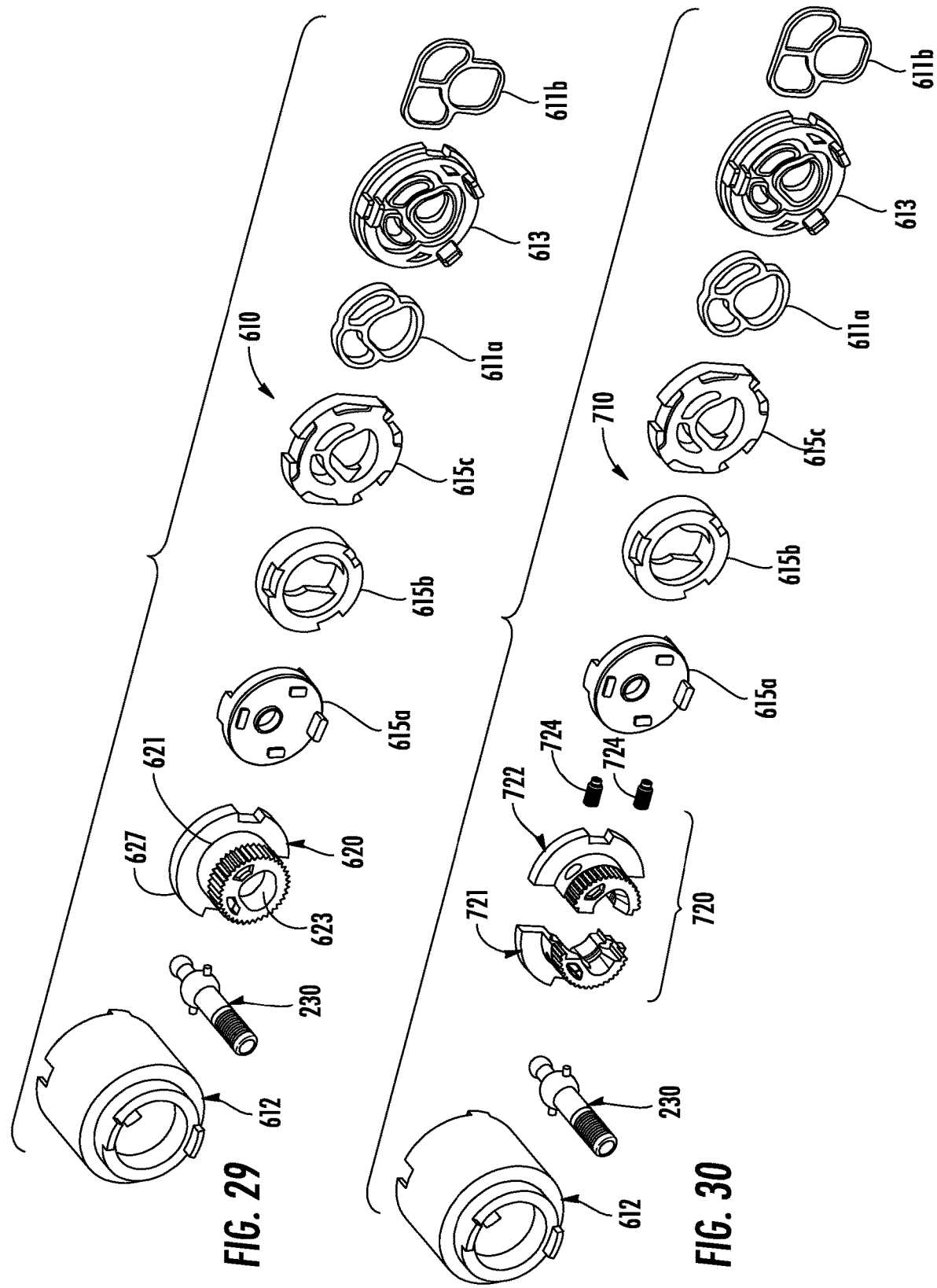

FAUCET WITH IMPROVED VALVE

CROSS-REFERENCE TO RELATED PATENT APPLICATIONS

This application is a Continuation of U.S. patent application Ser. No. 16/564,316, filed Sep. 9, 2019, which claims the benefit of and priority to U.S. Provisional Patent Application No. 62/729,264, filed Sep. 10, 2018. The entire disclosures of U.S. patent application Ser. No. 16/564,316 and U.S. Provisional Patent App. No. 62/729,264 are incorporated by reference herein.

BACKGROUND

The present application relates generally to the field of valves for faucets. More specifically, this application relates to improved cartridge valves for use with top mount faucet controls, standalone faucet controls, and "joystick" style faucet controls, among others.

SUMMARY

At least one embodiment of this disclosure relates to a cartridge valve for a faucet. The cartridge valve includes a housing, a stem adapter, and a stem assembly. The stem adapter is configured to be at least partially received in the housing and includes a body defining a first hole, which extends in a longitudinal direction. The stem assembly includes a first stem component and a second stem component. The first stem component includes an arm and a spherical portion that is configured to be at least partially positioned within the first hole and defines an opening. The second stem component has a body that is configured to be at least partially received within the opening of the first stem component. The spherical portion is configured to expand in size (e.g., diametrically) in response to the first end inserting a portion of the body of the second stem component into the opening in the first stem component, which increases a frictional resistance induced by relative rotation between the stem assembly and the stem adapter.

At least one embodiment of this disclosure relates to a cartridge valve for a faucet. The cartridge valve includes a housing, a stem adapter, a stem assembly, and a plug assembly. The stem adapter is configured to be at least partially received in the housing and includes a body defining a hole extending in a longitudinal direction and a bore extending in a radial direction. The stem assembly has an arm and a spherical portion that is configured to be at least partially positioned within the hole. The plug assembly includes a plug configured to be located in the bore proximate the stem assembly and a screw configured to be threaded in the bore and configured to compress the plug against the stem assembly in response to tightening the screw to increase a normal force between the plug and the stem assembly.

At least one embodiment of this disclosure relates to a cartridge valve for a faucet. The cartridge valve includes a housing, a stem adapter, and a stem assembly. The stem adapter is configured to be at least partially received in the housing and includes a body defining a first hole, which extends in a longitudinal direction. The stem assembly is at least partially received in the first hole and defines a second hole therethrough. The stem assembly includes a first stem component and a second stem component. The first stem component includes an arm and a spherical portion that is configured to be at least partially positioned within the first hole and defines an opening. The second stem component includes a body that is configured to be at least partially received within the opening of the first stem component. The spherical portion is diametrically repositionable from a clearance fit and an interference fit within the body of the stem adapter.

BRIEF DESCRIPTION OF THE DRAWINGS

FIG. 8 is a perspective view of a stem adapter of the control valve shown in FIG. 3.

FIG. 9 is a perspective view of a stem of the control valve shown in FIG. 3.

FIG. 10 is a side view of several screws for use with the control valve shown in FIG. 3.

FIG. 29 is an exploded plan view of a valve according to another embodiment.

FIG. 30 is an exploded plan view of a valve according to another embodiment.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are new cartridge valve assemblies (e.g., valves, cartridge valves, etc.) for faucets (and other water delivery devices) that have single control handles (e.g., top-mount handles, side-mount handles, joystick style handles, etc.) that control operation (e.g., water flow, water temperature) of the faucet. The new cartridge valve assemblies are configured to provide a tailored torque to move the handle by having a tailored frictional resistance to such movement. This arrangement advantageously allows for the handles to have any configuration (e.g., size, shape, etc.), since the torque can be tailored to the specific configuration of the handle (e.g., length, weight, mass moment of inertia), which gives the faucet and handle designers much greater freedom, such as in terms of styling and aesthetics. The valves disclosed herein are relative low cost, while allowing for faucets to have a longer and higher mass faucet handles than previous valves allowed. The valves further can be used in the faucet design to provide expanded aesthetic flexibility, such as through improved torsional friction to support longer and/or heavier handles, as well as improved smoothness and comfort when operating the faucet handle. These and additional advantages will be clear from the following disclosure. It is noted that the term "joystick" is used herein to generally denote an elongated member having a large aspect ratio of length to width (e.g., diameter), which therefore resembles a joystick controller.

Figure 1:
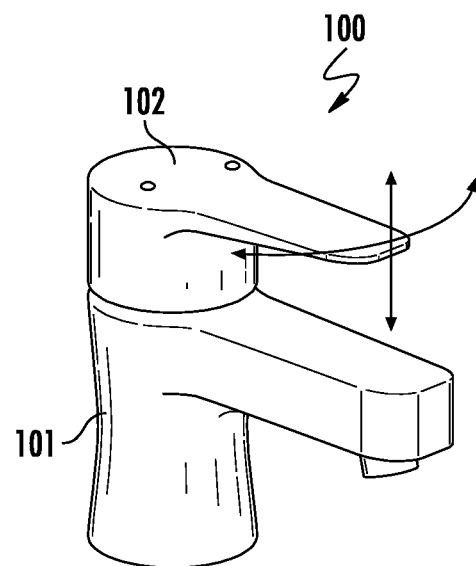
FIG. 1 is a perspective view of a faucet having a top mount handle that incorporates the aspects of this disclosure.

FIG. 1 illustrates an exemplary embodiment of a faucet 100 having a body 101 (e.g., base, spout, etc.) and a handle 102 movably disposed on the body 101 to control operation of a valve (e.g., the valve 110 shown in FIGS. 3-12) in the body 101 for controlling the temperature and flow rate of water from an outlet of the body 101. The illustrated handle 102 is moveable from side to side (e.g., laterally) relative to the body 101 to control the temperature of water and is moveable up and down (e.g., top to bottom, etc.) relative to the body 101 to turn on/off the flow and control the flow rate of water. For example, movement of the handle 102 to the right of center (e.g., aligned with the spout of the body 101) decreases the temperature, movement of the handle 102 to the left of center increases the temperature, and movement of the handle 102 upward from the off position (e.g., full down) increases the flow rate of water.

Figure 2:
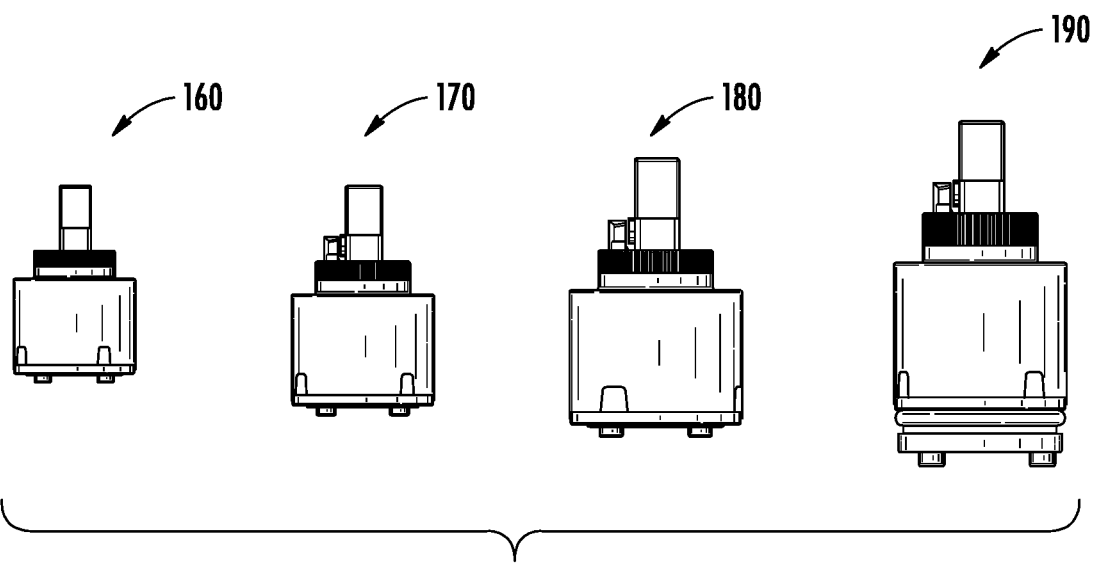
FIG. 2 is a plan view of various sized control valves incorporating the aspects of this disclosure.

FIG. 2 illustrates several different sized valves (e.g., valve cartridges) for controlling the temperature and flow of water, including a 25 mm sized (e.g., diameter) valve 160, a 35 mm sized valve 170, a 40 mm sized valve 180, and a 35 mm tall valve 190. It is noted that the aspects of this disclosure can be incorporated into any sized valve, and the different sized valves disclosed herein are exemplary and not limiting. For example, the valve 110 (as described further herein) may be sized according to any of the valve sizes shown in FIG. 2 or may be a different size from the valve sizes shown in FIG. 2.

Figure 4:
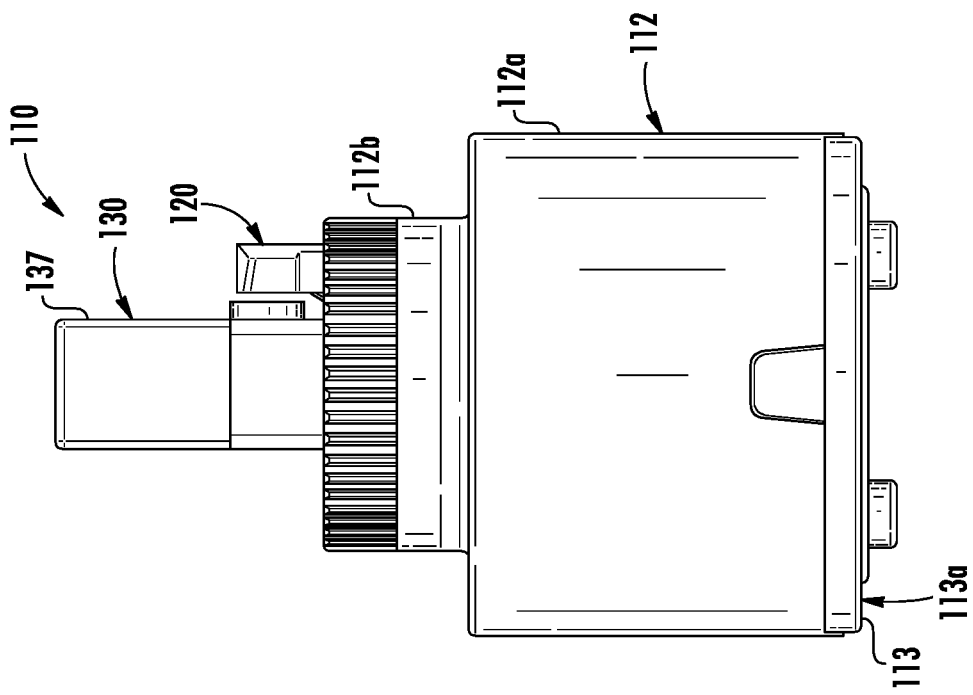
FIG. 4 is a side view of the valve of FIG. 3.
Figure 3:
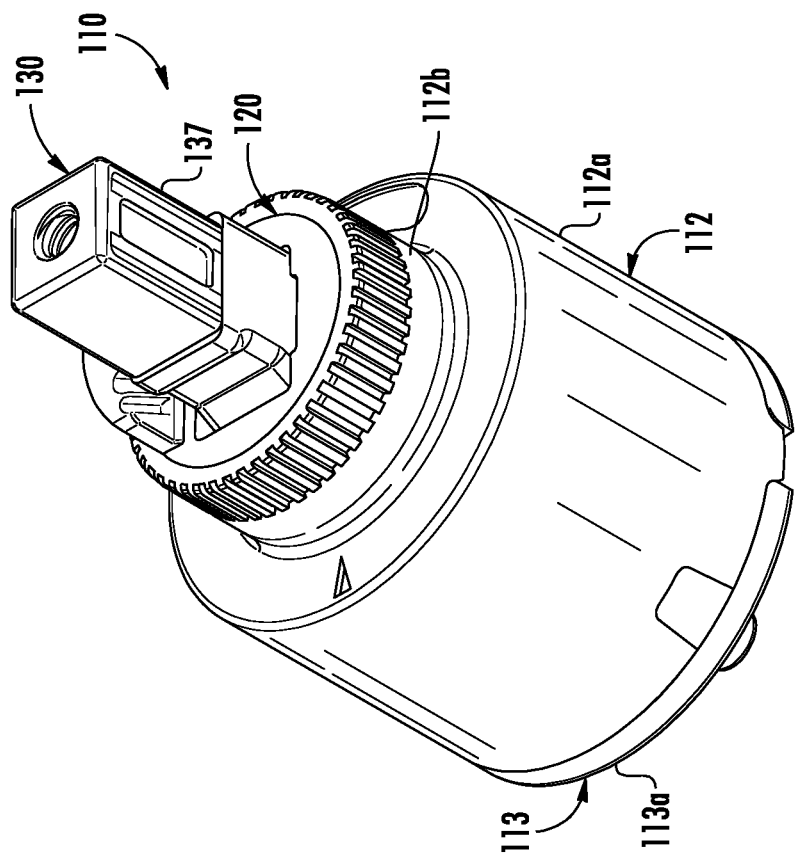
FIG. 3 is a perspective view of a valve according to one embodiment, such as one of the control valves shown in FIG. 2.
Figure 6:
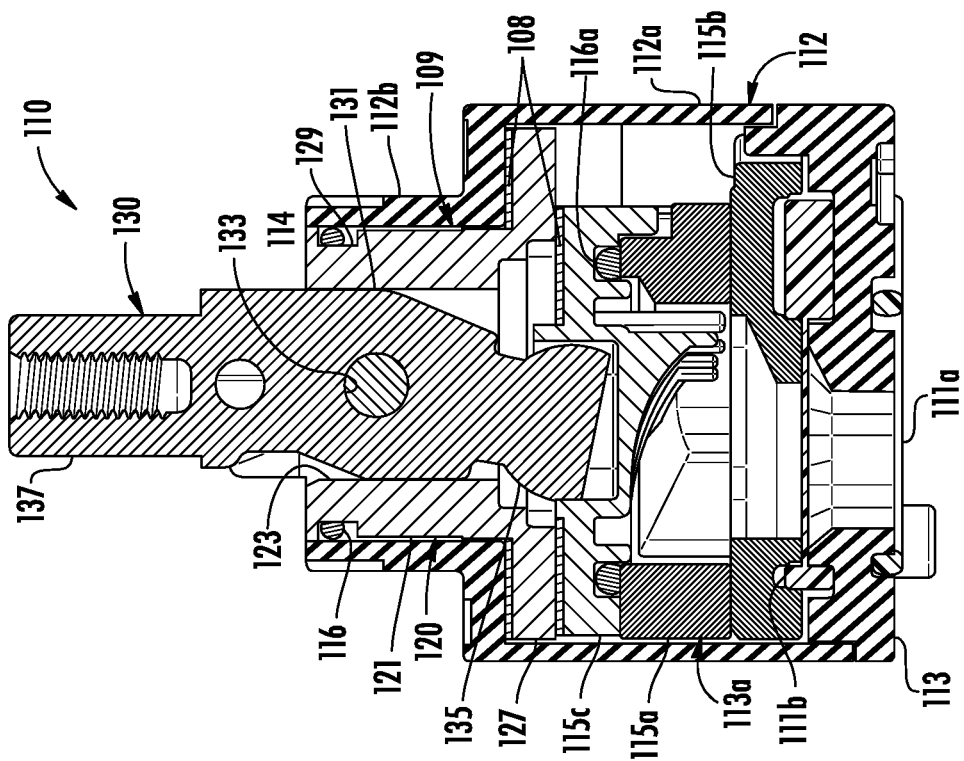
FIG. 6 is another side, cross-sectional view of the valve of FIG. 3.
Figure 5:
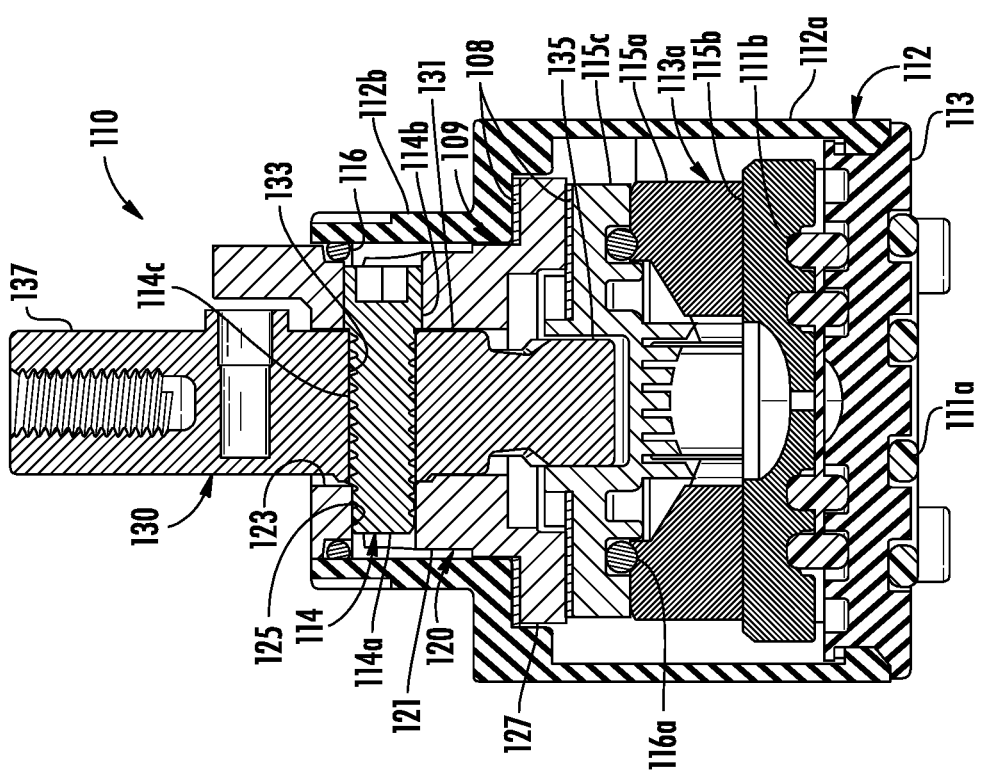
FIG. 5 is a side, cross-sectional view of the valve of FIG. 3.
Figure 7:
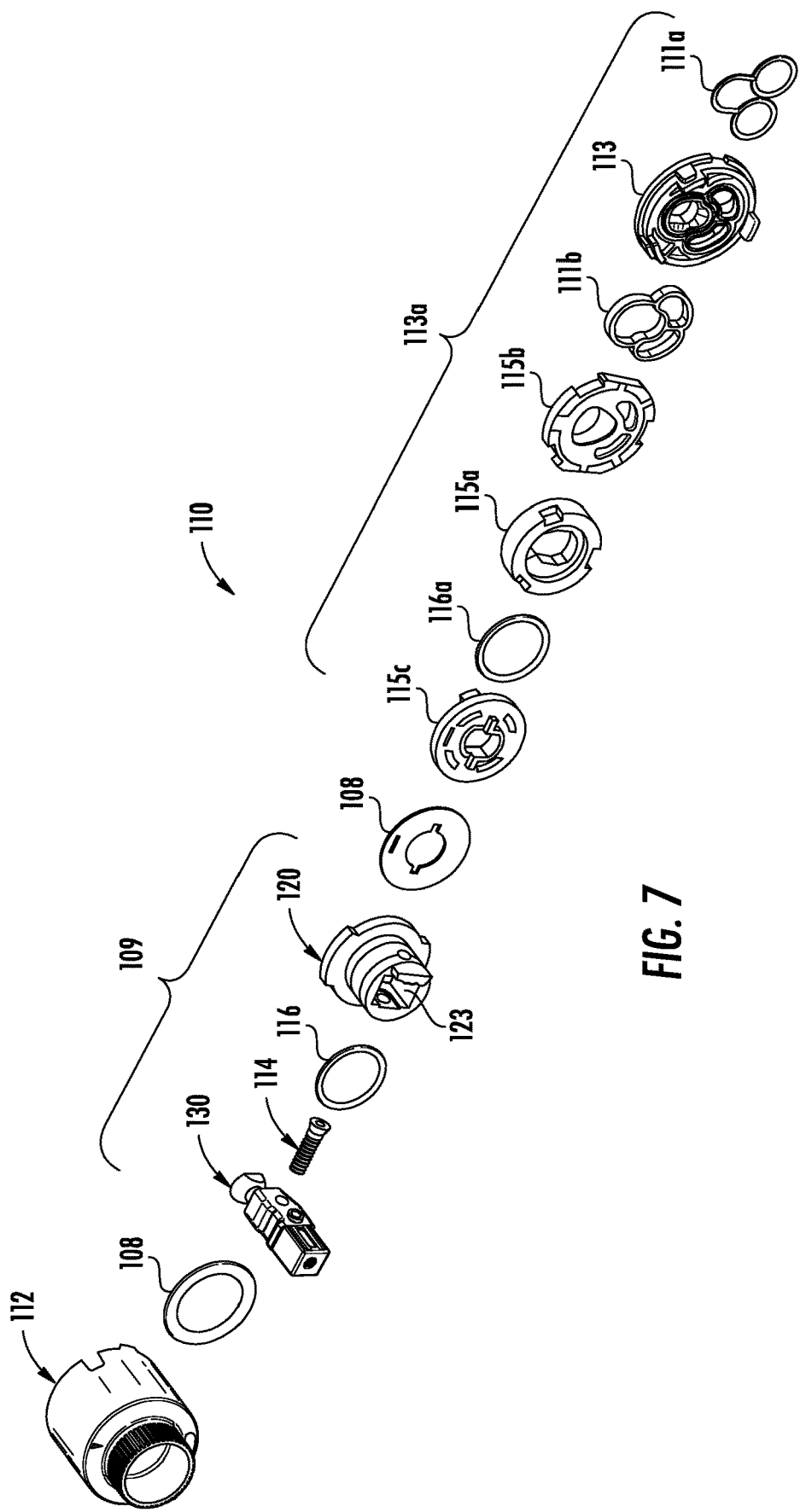
FIG. 7 is an exploded perspective view of the valve of FIG. 3.

FIGS. 3-12 illustrate various portions and views of an exemplary embodiment of the valve 110 for a faucet (such as the faucet 100 shown in FIG. 1). FIGS. 3-4 are perspective and side views, respectively, of the valve 110. FIGS. 5-6 are two different cross-sectional side views of the valve 110 in its assembled state, and FIG. 7 is an exploded view of the valve 110. As shown, the valve 110 includes, among other components and/or elements, a housing 112, a stem adapter 120 that is received in the housing 112, a stem 130 for controlling operation of the valve 110, a stem screw 114 operatively coupling the stem 130 to the stem adapter 120, and an O-ring 116 disposed between the housing 112 and the stem adapter 120 to provide a tailored frictional resistance during adjustment of the temperature of the valve 110 (e.g., rotation of the stem adapter 120 relative to the housing 112. As described further herein, a valve subassembly 109 of the valve 110 includes the stem screw 114, the stem 130, the O-ring 116, and the stem adapter 120.

As shown in FIGS. 3-7 and 8, the housing 112 of the valve 110 includes a lower sleeve 112a and an upper sleeve 112b illustrated having a smaller diameter than the lower sleeve 112a. The lower sleeve 112a and the upper sleeve 112b share a common central axis and define an aperture that extends completely through the entire housing 112 (in particular through both the lower sleeve 112a and the upper sleeve 112b). As shown in FIGS. 5-6, the lower sleeve 112a of the housing 112 receives the stem adapter 120. In particular, the stem adapter 120 is inserted into the lower sleeve 112a of the housing 112 and moved within the housing 112 toward the upper sleeve 112b such that the stem adapter 120 is partially positioned within both the lower sleeve 112a and the upper sleeve 112b of the housing 112 once assembled. The lower sleeve 112a and the upper sleeve 112b of the housing 112 also each receive a portion of the stem 130 and is sized to allow relative movement of the stem 130 within the upper sleeve 112b. The stem 130 extends beyond the end of the upper sleeve 112b, outside of the housing 112.

Figure 12:
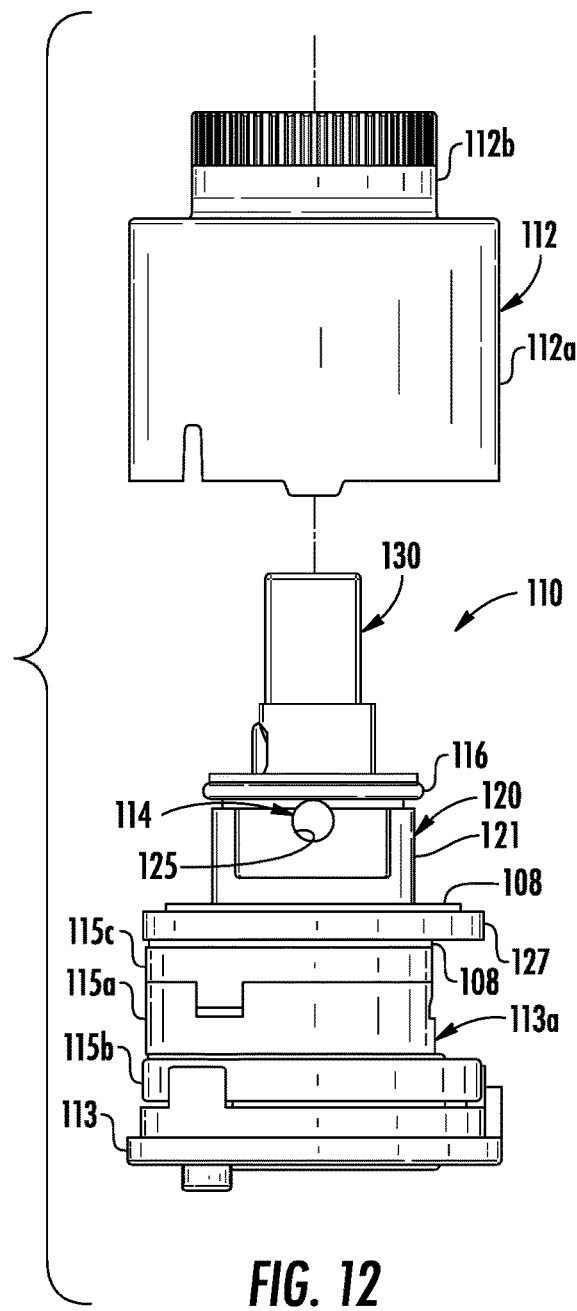
FIG. 12 is a partially exploded side view of the control valve shown in FIG. 3 with the housing separated from the base structure and valve subassembly.

As shown in FIGS. 5-6 and 8, the illustrated stem adapter 120 is at least partially received within the housing 112. The stem adapter 120 includes a body 121, which is received in the lower sleeve 112a of the housing 112 during assembly (and positioned at least partially within the upper sleeve 112b once assembled) and has a generally cylindrical exterior that extends along a longitudinal axis. The body 121 defines an internal cavity or first (e.g., slotted) hole 123 that extends in a longitudinal direction completely through the body 121, which is depicted in the FIGS. 7-8 as having a generally rectangular shape. The slotted hole 123 receives the stem 130 and is configured to allow movement of the stem 130 within the slotted hole 123 relative to the body 121 about the horizontal axis defined by the stem screw 114. The inner edges of the body 121 defining the hole 123 can limit amount of travel of the stem 130. As shown in FIGS. 5 and 8, the body 121 also defines a second (e.g., threaded) hole 125 that extends transversely (e.g., in a radial or horizontal direction, substantially perpendicular to the longitudinal direction) completely through the body 121 and receives the stem screw 114 (as shown in FIG. 5). The threads of the hole 125 are matched to the threads of the stem screw 114. As shown in FIG. 8, the threaded hole 125 may extend through and continue on either side of the slotted hole 123. Optionally, the stem adapter 120 includes a lower member 127 positioned at the lower end of the body 121 within the lower sleeve 112a of the housing 112. The illustrated lower member 127 has a larger size (e.g., diameter) than the body 121 and is configured to be coupled to the base structure 113a of the valve 110 (as shown in FIGS. 5-6 and 12). The lower member 127 and the base structure 113a can include matching anti-rotation features to prevent relative movement (e.g., rotation) of the stem adapter 120 relative to the base structure 113a of the valve 110. As shown in FIGS. 6 and 8, the stem adapter 120 defines a recess 129 is located along the outside surface of the body 121 proximate an upper end of the body 121 (that is opposite the lower member 127) and above the hole 125 (such that the hole 125 is longitudinally between the recess 129 and the lower member 127). As shown in FIG. 6, the recess 129 is configured to receive the O-ring 116 and has a shape (e.g., semi-circular) that complements the shape of the O-ring 116 (e.g., circular) to retain the O-ring 116 in place relative to the body 121.

As shown in FIGS. 5-6 and 9, the illustrated stem 130 includes a longitudinally extending central portion 131 defining a radially extending threaded hole 133 that receives the stem screw 114 (as shown in FIGS. 5-6), a first end 135, and a second end 137. The first end 135 is disposed on one side (e.g., a bottom side) of the central portion 131, and the second end 137 is disposed on another (opposite) side (e.g., a top side) of the central portion 131. The illustrated first end 135 has a semi-spherical shape and is configured to seat in another element (e.g., a disk, such as disk 115c as shown in FIGS. 5-6) of the valve 110 to drive movement of the other element (e.g., the disk) in response to movement of the stem 130 relative to the stem adapter 120. Accordingly, movement of the second end 137 translates into and causes movement of the other element (e.g., the disk) of the valve 110 through the first end 135. The illustrated second end 137 has a generally rectangular-cuboidal shape and is configured to extend through and beyond the slotted hole 123 of the stem adapter 120 and couple to an actuator (e.g., handle, lever, knob, etc.) that controls movement of the second end 137 (and therefore the stem 130). For the faucet 100 shown in FIG. 1, the second end 137 is operatively coupled to the handle 102 so that movement of the handle 102 by a user moves the stem 130 to control operation of the valve 110.

As shown in FIG. 5, the stem screw 114 threads to both the body 121 of the stem adapter 120 and the central portion 131 in the stem 130 through the threaded holes 125, 133, respectively, to operatively and rotatably couple the stem 130 to the stem adapter 120 while allowing movement of the stem 130 relative to the stem adapter 120. This arrangement of having a threaded stem screw 114 (e.g., a set screw) is advantageous over unthreaded stem pins (i.e., roller bearings), because the threaded stem screw 114 allows the frictional force (e.g., frictional resistance or friction that resists movement of the stem 130 relative to the stem adapter 120) to be tailored to the specific design of the valve 110 and the faucet (or other water control device) in which the valve 110 is employed. In particular, as a result of the particular stem screw 114 and the threaded holes 125, 133, the stem 130 and the stem adapter 120 are rotatably coupled together at a first predetermined frictional resistance in response to rotation of the stem 130 relative to the stem adapter 120. For example, the length, diameter (e.g., pitch diameter), thread lead, thread type employed with the threaded stem screw 114 (as shown, for example, in FIG. 10) influence the friction torque about the rotational axis of the stem screw 114 and, therefore, can be tailored and optimized to produce a specific range or a specific target of frictional torque. Different faucets have handles with different configurations (e.g., length, weight, mass moment of inertia, etc.), so the ability to tailor the friction torque advantageously allows the torque required to move the handle to be tailored to the specific faucet design, such as to move the handle 102 in the on and off direction for the faucet 100 shown in FIG. 1. This provides added flexibility to the faucet designer, such as, by allowing the handles 102 to be larger or have shapes that could not be previously utilized with previous valves. Additionally, the respective diameters of the hole 125 of the stem adapter 120 and the threaded hole 133 of the stem 130 can be changed according to the desired frictional force.

As shown in FIGS. 5 and 10, the stem screw 114 includes a first end 114a, a second end 114b, and an intermediate portion 114c that is located between the first end 114a and the second end 114b along the length of the stem screw 114. At least one of the first end 114a and the second end 114b are threaded to the body 121 of the stem adapter 120. For example, as shown in FIG. 5, the first end 114a of the stem screw 114 is received in and threaded to the threaded hole 125 on a first portion of the body 121, and the second end 114b of the stem screw 114 is received in (and optionally also threaded to) the threaded hole 125 on a second portion of the body 121, where the first portion and the second portion of the body 121 are on opposite sides of the slotted hole 123 of the body 121. The intermediate portion 114c of the stem screw 114 is received in and threaded to the threaded hole 133 on the central portion 131 of the stem 130.

Figure 11:
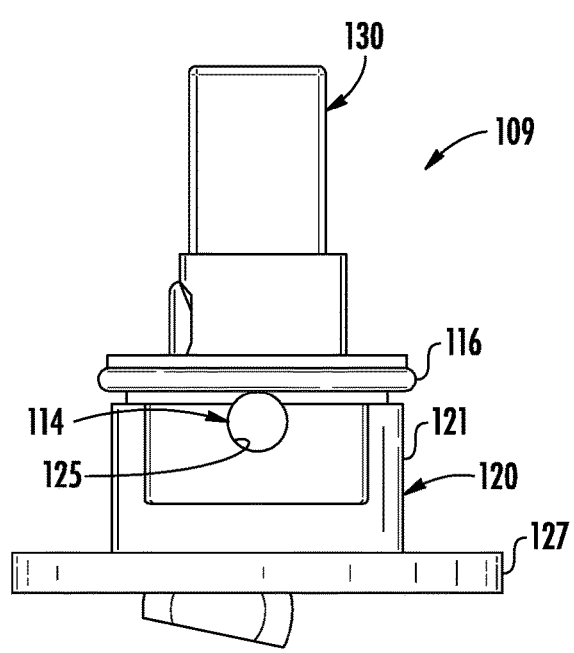
FIG. 11 is a side view of a valve subassembly of the control valve shown in FIG. 3.

FIG. 11 illustrates the stem 130 operatively coupled to the stem adapter 120 through the stem screw 114 forming the valve subassembly 109 (or the "stem adapter subassembly") of the valve 110 that includes the stem screw 114, the stem 130, the O-ring 116, and the stem adapter 120. Also shown, the O-ring 116 is received in the recess 129 in the body 121 of the stem adapter 120. Once the housing 112 (FIG. 12) is coupled over the valve subassembly 109, the O-ring 116 is disposed between an inner surface of the upper sleeve 112b of the housing 112 and the stem adapter 120 (as shown in FIGS. 5-6) at a second predetermined frictional resistance. Accordingly, the O-ring 116 induces friction resistance upon movement of and in response to rotation of the stem adapter 120 relative to the housing 112. Further, this friction resistance can be tailored through the configuration of the O-ring (e.g., diameter, shape, amount of compression or elastic deformation when installed, material type, etc.). In this way, the valve 110 provides a tailored torque to rotate the stem adapter 120 relative to the housing 112, such as through side to side rotation of the handle 102 (and the stem 130) of the faucet 100 to control the water temperature.

The valve 110 can include other elements/components. The valve 110 illustrated in FIG. 7 includes a base structure 113a that includes a base 113 that couples to the housing 112; a plurality of seals (e.g., gaskets) 111a, 111b; another O-ring 116a, and a plurality of disks 115a, 115b, 115c that are configured to control the flow and temperature of water through the valve 110 based on movement of the stem 130. For example, one or more of the disks (e.g., disk 115a, disk 115c) can be configured to move (e.g., slide, rotate, etc.) relative to a stationary disk (e.g., disk 115b). The valve 110 may also include various washers 108. For example, as shown in FIGS. 5-6, a washer 108 is positioned between the upper surface of the lower member 127 of the stem adapter 120 and an inner surface (between the lower sleeve 112a and the upper sleeve 112b) of the housing 112. Another washer 108 is positioned between the lower surface of the lower member 127 and the upper surface of the disk 115c. The valve 110 can include fewer elements or additional elements to those described herein, and the specific configuration of the elements can be different than that shown and described.

In operation, the valve 110 provides a first tailored torque (as a result of the stem screw 114, as described further herein) to rotate the stem 130 relative to the stem adapter 120 about the pivot axis defined by the stem screw 114 (e.g., vertical rotation about a horizontal axis defined by the stem screw 114) to control the flow rate of water flowing through the valve 110, and also provides a second tailored torque (as a result of the O-ring 116, as described further herein) to rotate the stem 130 and stem adapter 120 relative to the housing 112 about the longitudinal axis (e.g., horizontal rotation about a vertical axis) to control the temperature of water through the valve 110. The configuration of the valve 110 also allows for easy retrofitting into faucets (and other water distribution devices) that include current cartridge valves, since the overall size (e.g., outer size or package envelope) is the same as current cartridge valves. The configuration of the valve 110 can be employed with stems made from polymeric materials as well as metals.

Figure 13:
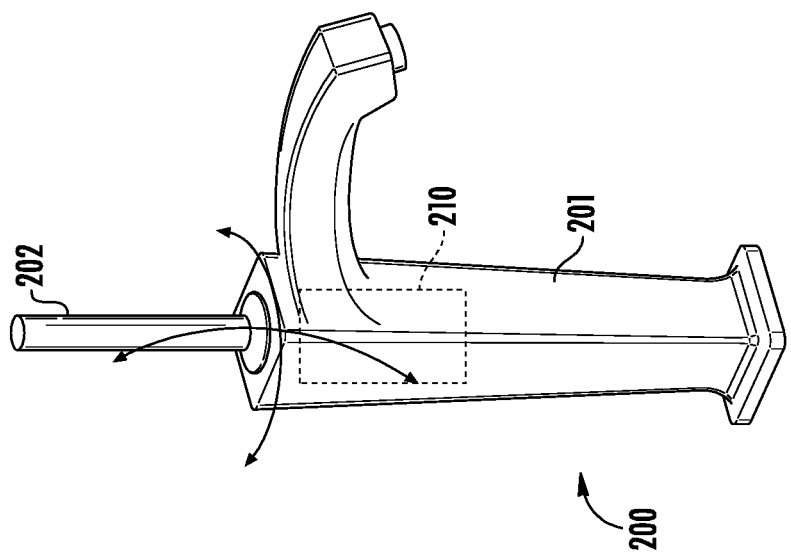
FIG. 13 is a perspective view of a faucet having a top mount joystick handle that incorporates the aspects of this disclosure.

FIG. 13 illustrates an exemplary embodiment of a faucet 200 having a body 201 (e.g., base, spout, etc.) and a joystick style handle 202 movably disposed on the body 201 to control operation of a valve (e.g., the valve 210 shown in FIG. 15) located within the body 201 for controlling the temperature and flow rate of water from an outlet of the body 201. The illustrated handle 202 is moveable from side to side (e.g., laterally) relative to the body 201 (e.g., the spout) to control the temperature of water and is moveable or rotatable from front to back (e.g., fore and aft, etc.) relative to the body 201 (e.g., the spout) to turn on/off the flow and control the flow rate of water. For example, movement of the handle 202 to the right of center (e.g., in which the handle 202 extends substantially vertically) decreases the water temperature, movement of the handle 202 to the left of center increases the water temperature, and movement of the handle 202 forward and/or rearward relative to the center from the off position (e.g., full down) increases and/or decreases the flow rate of water.

Figure 14:
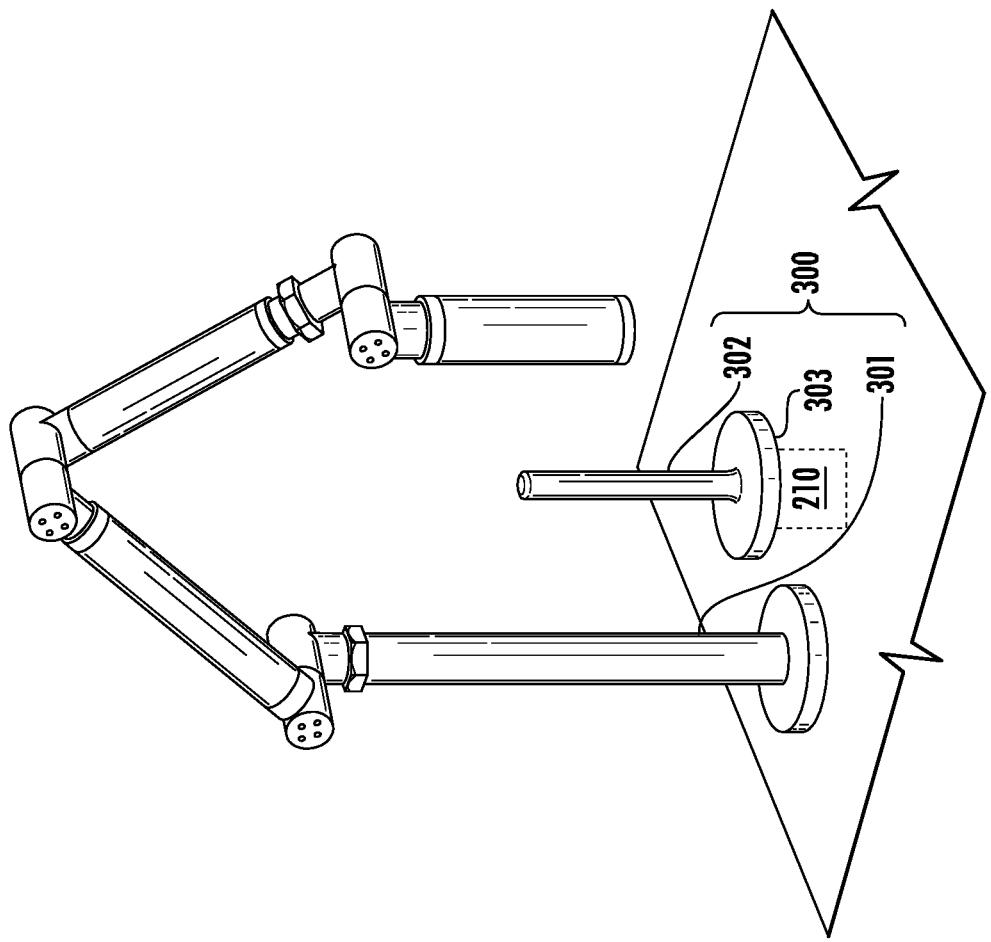
FIG. 14 is a perspective view of a faucet having a remotely located joystick handle that incorporates the aspects of this disclosure.

FIG. 14 illustrates another exemplary embodiment of a faucet 300 that includes a body 301, which has a plurality of moveable segments, and a joystick style handle 302, which is configured to be mounted remote from the body 301 (e.g., on the same mounting surface that the body 301 is mounted) and is movable relative to an escutcheon 303 and the mounting surface to control operation of the valve 210 as disclosed herein and located beneath the mounting surface for controlling the temperature and flow rate of water from the body 301. For example, the illustrated handle 302 is moveable or rotatable in a first direction (e.g., side to side, laterally) relative to the body 301 (e.g., the spout), the escutcheon 303, and the mounting surface to control the water temperature and is moveable or rotatable in a second direction (e.g., front to back, fore and aft, etc.) relative to the body 301 (e.g., the spout), the escutcheon 303, and the mounting surface to turn on/off the flow and control the flow rate of water. For example, movement of the handle 302 to the right of center (e.g., in which the handle 302 extends substantially vertically) decreases the water temperature, movement of the handle 302 to the left of center increases the water temperature, and movement of the handle 302 forward and/or rearward relative to the center from the off position (e.g., full down) increases and/or decreases the flow rate of water.

Figure 16:
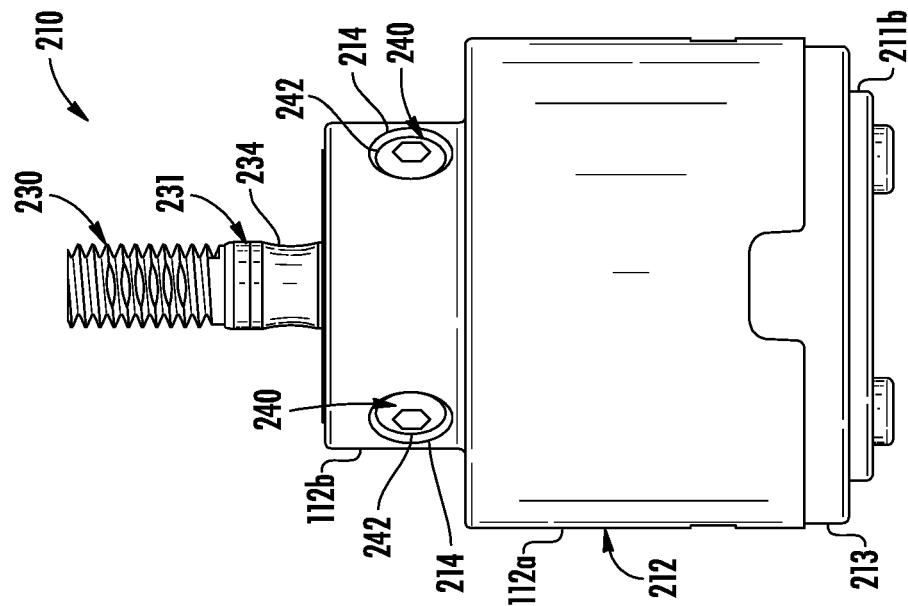
FIG. 16 is a side view of the valve of FIG. 15.
Figure 15:
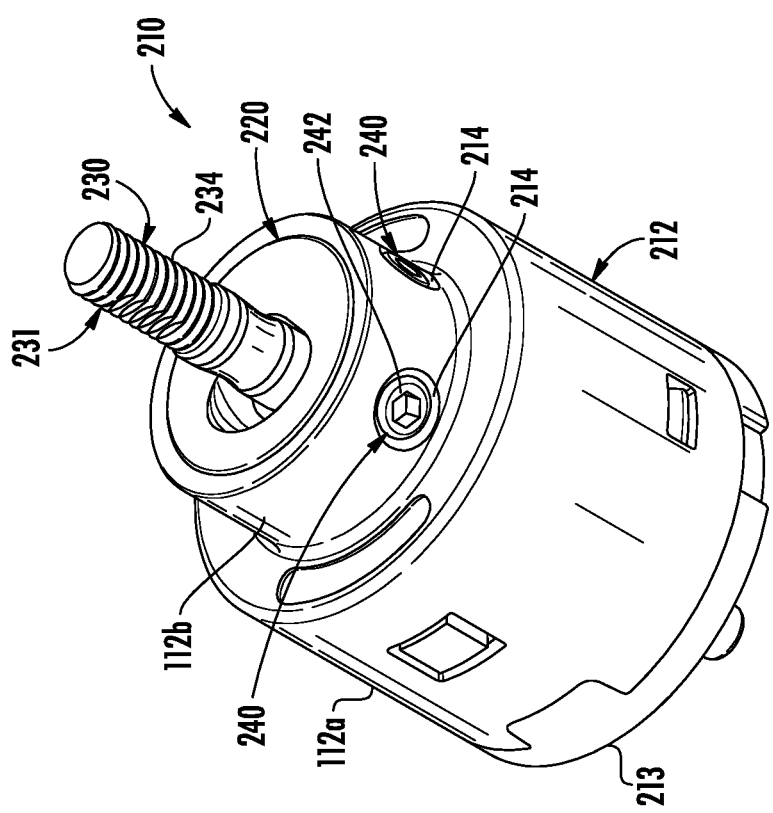
FIG. 15 is a perspective view of a valve according to one embodiment.
Figure 18:
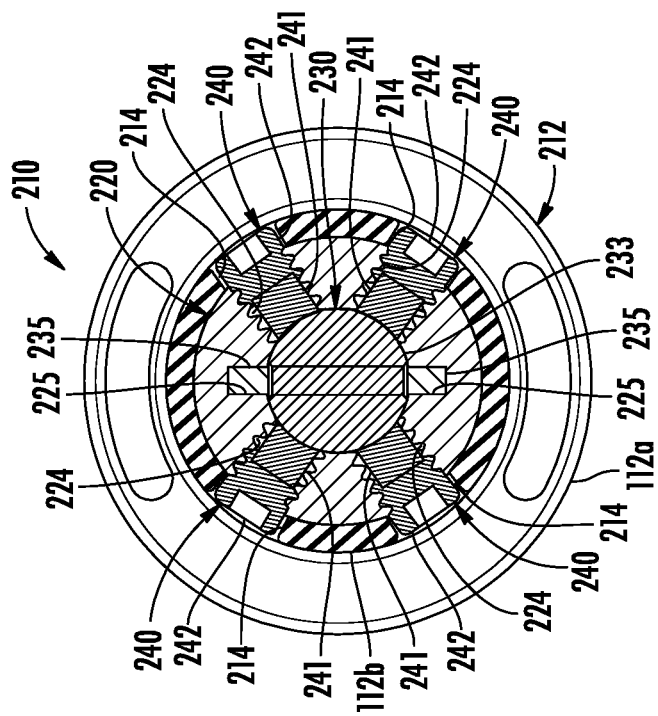
FIG. 18 is a top, cross-sectional view of the valve of FIG. 15.
Figure 17:
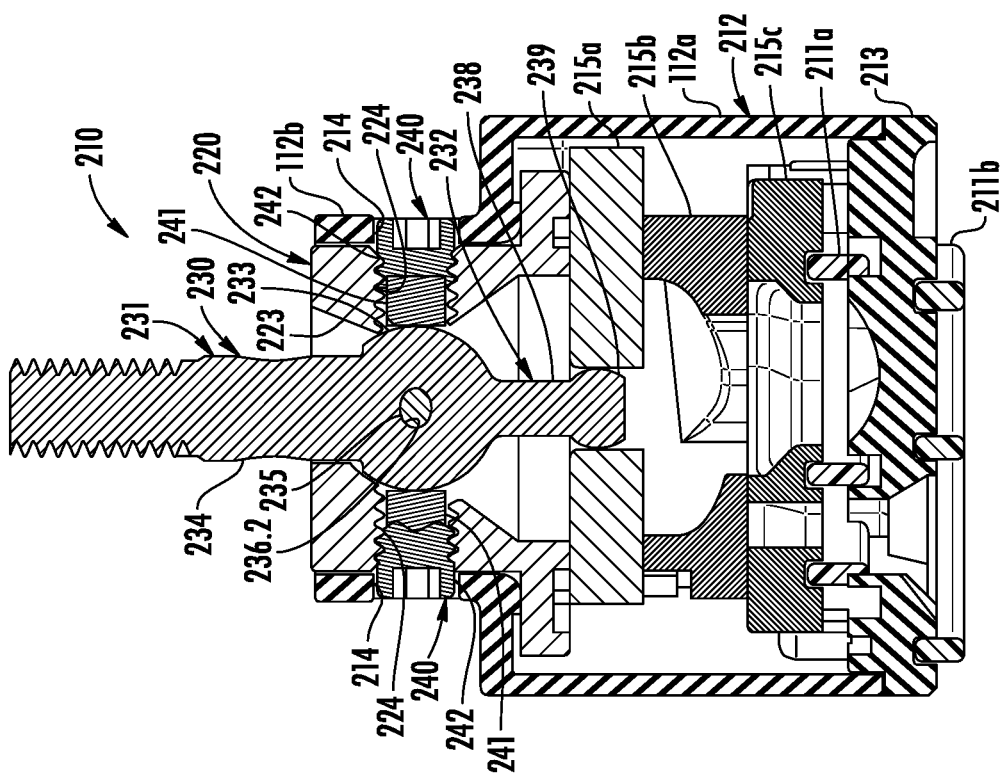
FIG. 17 is a side, cross-sectional view of the valve of FIG. 15.
Figure 19:
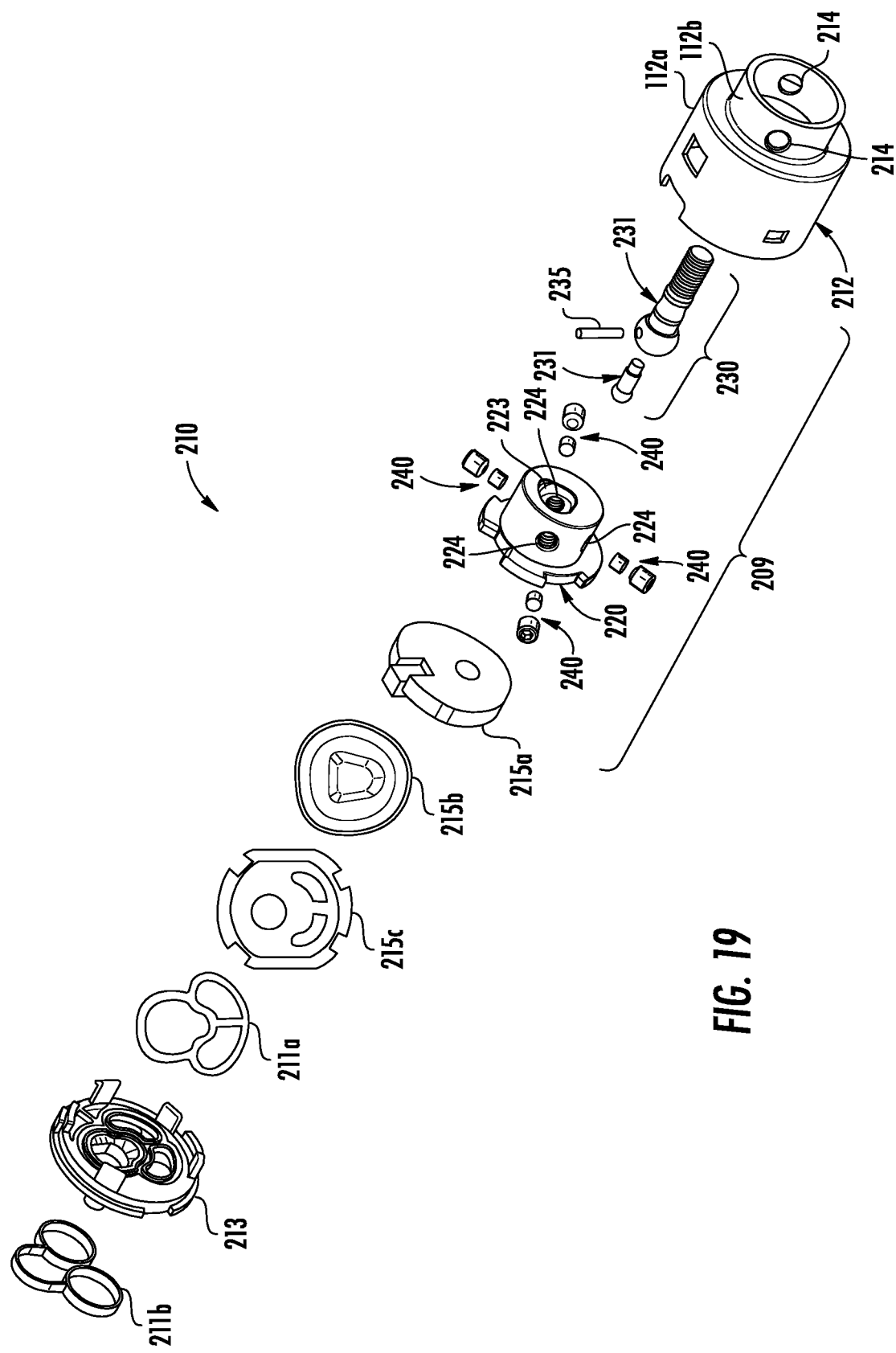
FIG. 19 is an exploded perspective view of the valve shown in FIG. 15.

FIGS. 15-19 illustrate various views of an exemplary embodiment of the valve 210 for a faucet (such as the faucets 200 and 300 shown in FIGS. 13-14, respectively). FIGS. 15-16 are perspective and side views, respectively, of the valve 210. FIGS. 17-18 are two different cross-sectional views of the valve 210 in its assembled state, and FIG. 19 is an exploded view of the valve 210. As shown, the valve 210 includes, among other components and/or elements, a housing 212, a stem adapter 220 that is at least partially received in the housing 212, and a stem assembly 230 for controlling operation of the valve 210. The illustrated housing 212 can be configured the same as or similar to the housing 112 of the valve 110 (e.g., including a lower sleeve 112a and an upper sleeve 112b), except where noted otherwise. As described further herein, a valve subassembly 209 of the valve 210 includes the stem adapter 220, the stem assembly 230, and at least one plug assembly 240.

Figure 20:
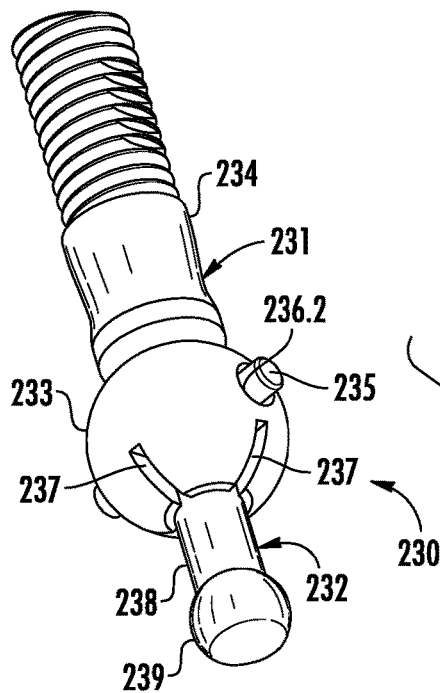
FIG. 20 is a perspective view of a joystick valve stem assembly of the valve shown in FIG. 15.
Figure 21:
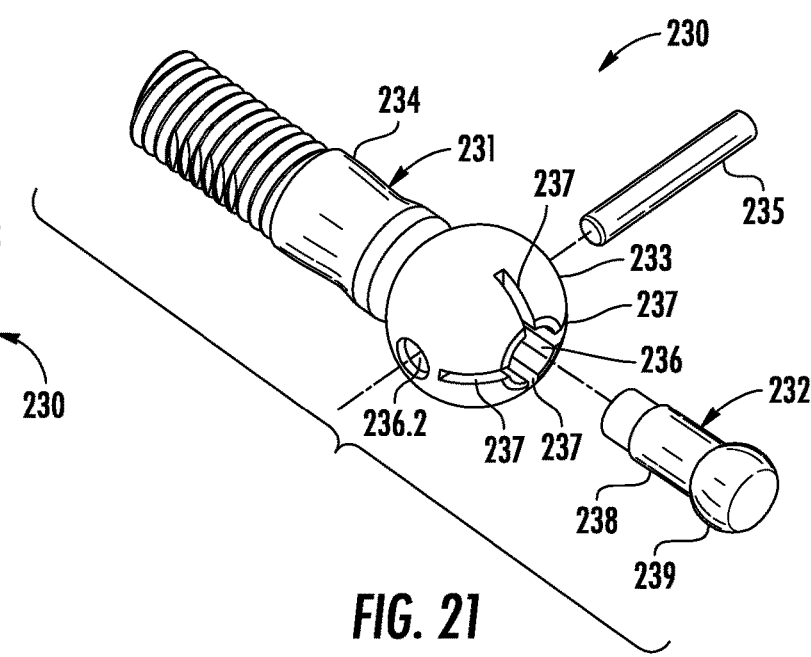
FIG. 21 is an exploded view of the stem assembly of FIG. 20.

As shown in FIGS. 20-21, the stem assembly 230 includes two pieces (i.e., a first stem component 231 and a second stem component 232) that are separately formed from each other and attachable to each other. In particular, the second stem component 232 adjustably couples to the first stem component 231 to change the size (e.g., expand, retract) of a portion of the first stem component 231 (in particular the spherical portion 233 of the first stem component 231), which influences (e.g., adjusts) the performance (e.g., an amount of torque to move the stem assembly 230) of the valve 210. The stem assembly 230 is positioned at least partially within the first hole 223 of the stem adapter 220 (as described further herein).

The illustrated first part or stem component 231 includes a spherical portion 233 and an arm 234 shown as a cylindrical portion extending away from a bottom portion of the spherical portion 233. As shown in FIGS. 17 and 21, respectively, the spherical portion 233 is at least partially positioned within the housing 212 (in particular within the first hole 223 of the body 221) and is disposed at one end of the arm 234. As shown in FIG. 21, a first end or bottom portion of the spherical portion 233 defines a hole, aperture, or opening 236 for receiving at least a portion of the second stem component 232 (in particular an end of the cylindrical body 238). The opening 236 extends longitudinally or axially into the spherical portion 233 (and optionally a portion of the arm 234). The first end or bottom portion of spherical portion 233 also defines one or more expansion and contraction split lines or slits 237 that extend longitudinally along at least a portion of the height of the spherical portion 233 (e.g., from the bottom portion (at the opening 236) toward the top portion (at the end of the arm 234) of the spherical portion 233). The slits 237 may extend completely through a wall of the spherical portion 233 that defines the opening 236. According to one embodiment, the spherical portion 233 defines four slits 237 that are spaced radially about the opening 236 (although the spherical portion 233 may define any number of or a plurality of slits 237). The one or more slits 237 allow the spherical portion 233 to expand and contract in size in response to a portion of the body 238 of the second stem component 232 being inserted into and inserted out of (e.g., threaded into and threaded out of) the opening 236 in the first stem component 231, respectively. The expansion and contraction of the spherical portion 233 changes or adjusts the performance (e.g., an amount of torque to move the stem assembly 230) of the valve 210 by increasing and decreasing, respectively, a frictional resistance induced by relative rotation between the stem assembly 230 and the stem adapter 220.

The spherical portion 233 further defines at least one aperture 236.2 that extends radially at least partially through the spherical portion 233. The stem assembly 230 further includes at least one rotating pin 235 that extends from the spherical portion 233 and is configured to be positioned within the aperture 236.2 and at least partially received within the second hole 225 of the stem adapter 220. According to one embodiment, the spherical portion 233 defines one aperture 236.2 that extends completely through the spherical portion 233 such that the spherical portion 233 receives one pin 235 that extends completely through the spherical portion 233. According to another embodiment, the spherical portion 233 defines two apertures 236.2 on opposite sides of the spherical portion 233 that are each configured to receive a different pin 235 such that two rotating pins 235 extend from opposite sides of the spherical portion 233. As shown in FIG. 18, opposite ends of the pin 235 (when there is one pin 235) or one end of each pin 235 (when there are two pins 235) engage with an associated slot or hole 225 in the stem adapter 220 (as described further herein) to facilitate and allow rotation of the stem assembly 230 relative to the stem adapter 220.

The illustrated arm 234 of the first stem component 231 extends from a second end or top portion of the spherical portion 233, along a side opposite the opening 236 and the slits 237. Accordingly, the arm 234 extends away from the spherical portion 233 and out through an end of the first hole 223 of the stem adapter 220. The arm 234 has a threaded portion (along at least a portion of the length of the outer surface of the arm 234) that is configured to attach or thread to the handle (e.g., the handle 202, 302 of the faucet 200, 300) to allow the handle to control operation (e.g., movement) of the stem assembly 230 (and thus to control the water flow and/or temperature) through the arm 234 of the first stem component 231. As shown in FIGS. 15-17, the threaded portion extends outside of the housing 212.

The illustrated second part or stem component 232 has a cylindrical arm or body 238 and a spherical member 239 disposed at one end of the body 238. As shown in FIG. 17, the second stem component 232 is positioned within the housing 212. According to one embodiment, at least a portion of the body 238 (e.g., one end of the body 238 that is opposite the spherical member 239) is configured to be at least partially received within the opening 236. In particular, an end of the body 238 (along a first end of the second stem component 232) is press-fit, frictionally fit, or threaded into the opening 236 on the spherical portion 233 of the first stem component 231 to couple the first and second stem components 231, 232 together. At least a portion of the body 238 may be tapered or stepped to obtain the desired increase in side of the spherical portion 233. According to another embodiment, at least a portion of the inner surface of the opening 236 is threaded and at least a portion of the outer surface of the cylindrical body 238 (for example, the end of the cylindrical body 238) is threaded. Accordingly, the threads of the body 238 thread to the opening 236 in the spherical portion 233 to couple the first and second stem components 231, 232 together. As noted above, the spherical portion 233 of the first stem component 231 is configured to expand/increase in size (e.g., increase diametrically/radially) from a clearance fit into an interference fit within the body 221 of the stem adapter 220 in response to the body 238 of the second stem component 232 being inserted or threaded further into the opening 236 (and into further engagement with the first stem component 231) from a first position to a second position relative to the first stem component 231. This expansion in size can be a predetermined increase (e.g., X mm) or can be a function of the coupling (e.g., how far the body 238 is inserted into the opening 236, which may be the number of the threads on the body 238 that are engaged with the threads of the opening 236 in the spherical portion 233). In this way, the increase in size of the spherical portion 233 can be controlled.

Further, the spherical portion 233 is configured to retract/decrease in size (e.g., decrease diametrically/radially) from the interference fit into the clearance fit within the body 221 of the stem adapter 220 in response to the body 238 being removed from (e.g., slide out from, unthreaded from, or rotated out of engagement with) the opening 236 of the first stem component 231 from the second position to the first position relative to the first stem component 231. As discussed below, the ability to expand/contract the size of the spherical portion 233 advantageously allows for the valve 210 to have a tailored frictional torque to move the stem assembly 230 relative to the stem adapter 220.

As shown in FIG. 17, the spherical member 239 of the second stem component 232 (along the second end of the second stem component 232) is engaged with (and therefore configured to drive motion of) other valve components and/or elements of the valve 210 (such as a disk) upon movement of the stem assembly 230 relative to the stem adapter 220. It is noted that the spherical member 239 can be semi-spherical (e.g., having a flat bottom, one or more sides, or combination thereof) or have any suitable shape to aid in driving motion.

This arrangement of having a two-piece stem assembly 230 is advantageous over one-piece stems, because the two-piece stem assembly 230 allows the frictional force (e.g., the force resisting movement of the stem assembly 230 relative to the stem adapter 220) to be tailored, such as to the specific design of the valve and faucet (or other water control device) in which the valve 210 is employed. As non-limiting examples, the configuration (e.g., sized, diameter, etc.) of the spherical portion 233 and the configuration (e.g., length, diameter, pitch diameter, thread lead, thread type employed) of the second stem component 232 can be changed to influence the friction torque, which can be tailored to a specific range or a specific target. Different faucets have handles with different configurations (e.g., length, weight, mass moment of inertia, etc.), so the ability to tailor the friction torque advantageously allows the torque required to move the handle to be tailored to the specific faucet and/or faucet handle design. This allows the handle to have any configuration (e.g., size, mass, length, etc.).

Figure 22:
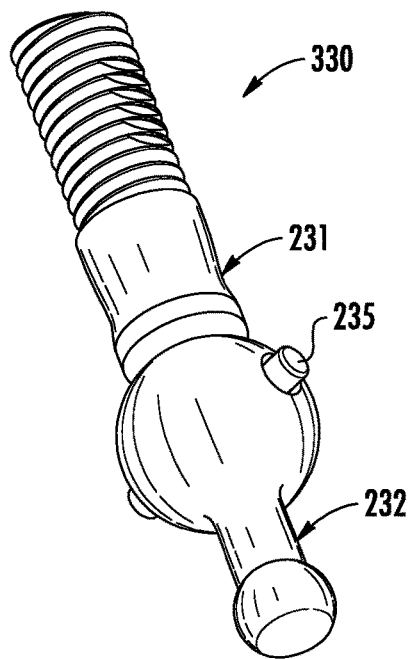
FIG. 22 is a perspective view of a stem assembly according to another embodiment.

However, according to another embodiment as shown in FIG. 22, a one-piece stem 330 may be used within the valve 210. The one-piece stem 330 may also include the first stem component 231 and the second stem component 232 (as described further herein), except that the first and second stem components 231, 232 are constructed together as a single-piece. Accordingly, the one-piece stem 330 includes a single unitary component (optionally aside from the pin 235) that cannot be separated without destruction. For example, the one-piece stem 330 (optionally aside from the pin 235) may be constructed as a single molded part.

As shown in FIG. 17, the stem adapter 220 is at least partially received within the housing 212. The stem adapter 220 illustrated in FIGS. 23-25 includes a body 221, which is at least partially received in the lower sleeve 112a of the housing 212 during assembly (and positioned at least partially within the upper sleeve 112b once assembled. The stem adapter 220 (and its body 221) has a configuration that is the same as or similar to the stem adapter 120 (and its body 121), except where noted otherwise. Furthermore, the stem adapter 220 may include the lower member 127 (as described further herein). The body 221 defines a slotted hole or an internal cavity (referred to herein as a first hole 223) that extends in a longitudinal direction completely through the body 221. As shown in FIG. 17, the first hole 223 is configured to receive at least a portion of the stem assembly 230 (in particular the spherical portion 233 of the first stem component 231) once assembled. The first hole 223 can be sized so that the spherical portion 233 nests therein, and such that the fit between the spherical portion 233 and first hole 223 in the body 221 provides a tailored rotational torque to move the stem assembly 230 relative to the stem adapter 220. Also for example, the first hole 223 in the body 221 can have a different shape than the first hole 123, since the illustrated body 238 is cylindrical (and has a circular cross-sectional shape). Thus, the shape of the first hole 223 can be configured differently based on the shape of the stem assembly 230.

Figure 25:
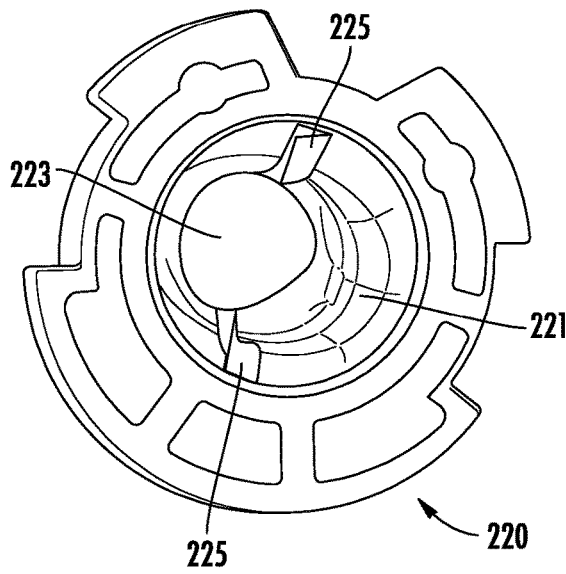
FIG. 25 is a bottom view of the stem adapter of FIG. 23.

Additionally, as shown in FIGS. 18 and 25, the body 221 defines at least one second hole 225 extending transversely (e.g., in a radial or horizontal direction, substantially perpendicular to the longitudinal direction) through at least a portion of the body 221. The second hole 225 is configured to receive at least a portion of the pin 235. In particular, the second hole 225 is configured to receive opposite ends of the pin 235 (when there is one pin 235) or one end of each pin 235 (when there are two pins 235) to facilitate and allow rotation of the stem assembly 230 relative to the stem adapter 220. According to one embodiment as shown in FIG. 25, the body 221 defines two second holes 225 are slots that are positioned directly opposite each other on opposite walls and extend only partially through opposite walls (in the radial direction). The slots extend partially along the longitudinal length of the body 221 (i.e., open on one end (such as the bottom end) and closed along the other end (such as the top end)) in order to allow the pin 235 to be inserted into and secured within each slot. According to another embodiment, the second hole 225 may be a single through-hole that extends completely through two opposite walls of the body 221 and through the first hole 223. The second hole 225 is not threaded, since the rotating pin(s) 235 are not threaded, as this embodiment controls the rotational torque through friction between the spherical portion 233 of the stem assembly 230 and the body 221 of the stem adapter 220.

Figure 23:
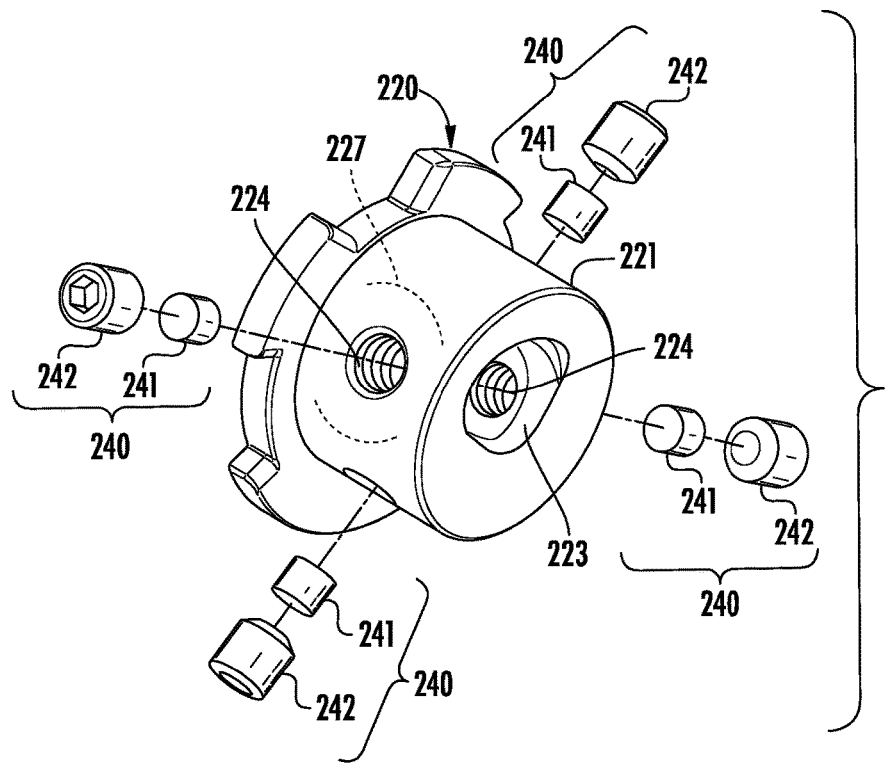
FIG. 23 is an exploded, perspective view of a joystick valve stem adapter and plug assemblies of the valve shown in FIG. 15.

Further, as shown in FIG. 23, the body 221 of the stem adapter 220 can optionally include one or more split lines or slits 227 (shown in dashed lines) that allow an outer surface of the stem adapter 220 to expand in size within and toward an inner surface of the housing 212 in response to when the spherical portion 233 expands diametrically. For example, the slits 227 can be located on opposite sides of the second hole 225 and/or one or more of the bores 224 (as described further herein) to allow the stem adapter 220 to expand. The body 221 may optionally define a plurality of slits 227. By increasing in size, a friction resistance induced by relative rotation between the stem assembly 230 and the housing 212 (through the stem adapter 220) is increased (and vice versa).

Figure 24:
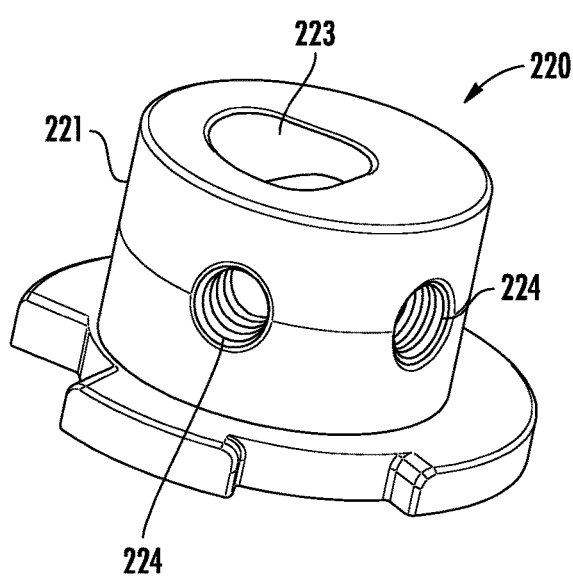
FIG. 24 is a perspective view of the stem adapter of FIG. 23.
Figure 26:
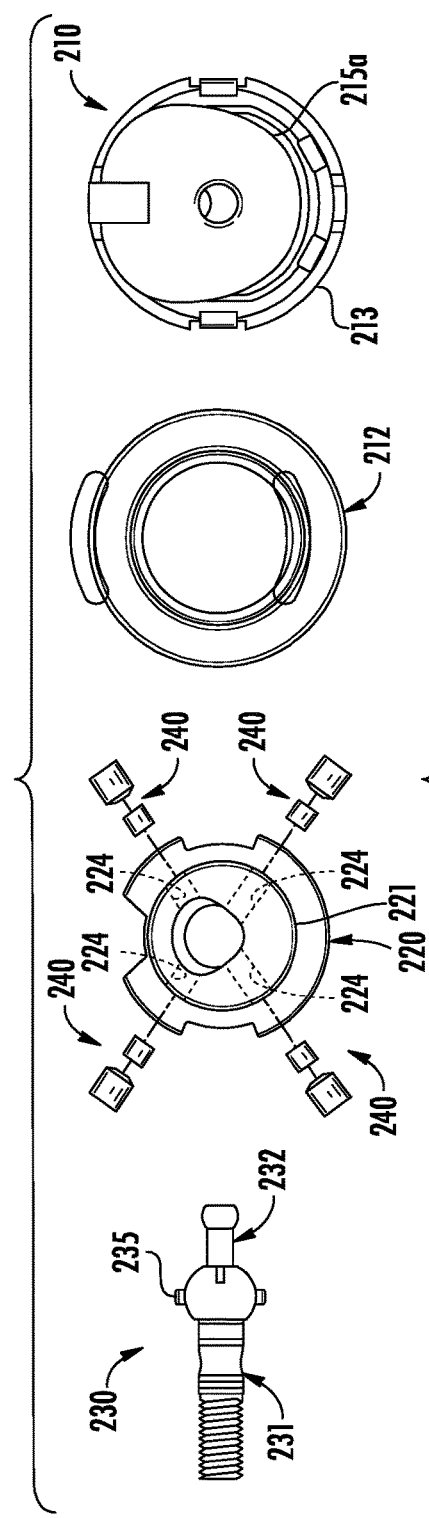
FIG. 26 is an exploded plan view of the valve of FIG. 15.

Additionally, as shown in FIGS. 16 and 24, the body 221 defines at least one third hole, through-hole, aperture, or bore 224 extending transversely (e.g., in a radial or horizontal direction, substantially perpendicular to the longitudinal direction) through at least a portion of the body 221. Each of the bores 224 are configured to receive at least a portion of a plug assembly 240 (as described further herein). As described further herein, the body 221 may define and include any number of bores 224, depending on the desired configuration. As shown in FIG. 26, two of the bores 224 may be positioned directly opposite each other (and aligned along their lengths) across the first hole 223. Each of the bores 224 extends completely through a wall of the body 221 (as a through-hole) and may be threaded in order to securely receive one of the plug assemblies 240. As shown in FIGS. 15-16, the housing 212 (in particular the upper sleeve 112b of the housing 212) also defines at least one through-hole 214. The size, number, and relative positions of the through-hole(s) 214 of the housing 212 directly corresponds to the size, number, and relative positions of the bores 224 of the body 221.

The valve 210 further includes at least one plug assembly 240 that is configured to be at least partially received and secured within one of the bores 224. As shown in FIG. 26, the valve 210 includes four plug assemblies 240 and four bores 224 (although the valve 210 may include any number of bores 224 and an equal or greater number of corresponding bores 224). Each of the plug assemblies 240 includes a plug 241 and a set screw 242. When installed, each set screw 242 is positioned at least partially within the associated bore 224, and each plug 241 is located in the associated bore 224 (as shown in FIGS. 17-18) and is seated along, pressed against, and/or proximate to the stem assembly 230 (in particular the spherical portion 233 thereof), depending on the desired adjusted position of the associate set screw 242 (and thereby how tightly each plug 241 presses against and spherical portion 233). Accordingly, the set screw 242 is positioned radially outward from the plug 241, and the plug 241 is positioned between the set screw 242 and the spherical portion 233 along the length of the bore 224.

The outer surface of each set screw 242 includes threads that thread to threads of the associated bore 224 to allow the set screw 242 to be secured and adjusted (e.g., tightened or loosened) through the mating threads. An outer end of each set screw 242 may include an indentation configured to receive a tool for adjusting how far the set screw 242 is tightened. In particular, by tightening the set screw 242 into the body 221 (and towards the spherical portion 233), the set screw 242 compresses the associated plug 241 against the spherical portion 233 of the stem assembly 230, which creates and increases a normal force between the stem assembly 230 and the compressed plug 241. In this state of compression, the plug 241 induces a tailored frictional resistance (depending on how far the set screw 242 is inserted into the bore 224) against the stem assembly 230 in response to movement of the stem assembly 230 relative to the plug 241 (and the stem adapter 220). Further, the frictional resistance is influenced (e.g., a function of) the amount of compression of the plug 241, so further compression or tightening of the set screw 242 toward the plug 241 increases the normal and frictional forces between the plug 241 and the spherical portion 233. Similarly, loosening the set screw 242 away from the plug 241 and from this state in turn reduces the normal and frictional forces between the plug 241 and the spherical portion 233. In this way, the frictional resistance can be tailored based on adjustment of each set screw 242 (each of the plug assemblies 240 can be independently adjusted relative to any other plug assemblies 240).

Each plug 241 is shown having a generally cylindrical shape. The outer surface of each plug 241 may not be threaded in order to allow the set screw 242 move or push the plug 241 along the length of the associated bore 224. Each plug 241 includes a material that is compliant (e.g., elastic, etc.), such as rubber, and has an end surface that contacts the spherical portion 233 of the stem assembly 230. According to one example, the end surface is flat. According to another example, the end surface of the plug 241 is concave (e.g., semi-spherical) to complement the shape of the spherical portion 233 of the stem assembly 230. This arrangement advantageously increases the surface of contact between the stem assembly 230 and the plug 241, even during relatively small compression forces. It should be noted that the various valves of this disclosure can be configured having one plug assembly 240 or a plurality of plug assemblies 240 and the body 221 defines one bore 224 or a plurality of bores 224 for each of the plug assemblies 240, and that the embodiment shown in FIGS. 15-26 is exemplary and not limiting.

Like the valve 110, the valve 210 can include other elements and/or components. The valve 210 illustrated in FIGS. 17 and 19 includes a base 213 that couples to the housing 212; a plurality of seals (e.g., gaskets) 211*a*, 211*b*; and a plurality of disks 215*a*, 215*b*, 215*c* that are configured to control the flow and temperature of water through the valve 210 based on movement of the stem assembly 230 relative to the housing 212. For example, one or more of the disks can be configured to move (e.g., slide, rotate, etc.) relative to a stationary disk to change the alignment of openings in the various disks to change the flow rate and/or temperature of water flowing through the valve 210. It is noted that the valve 210 can include fewer elements or additional elements to those described herein, and the specific configuration of the elements can be different than that shown and described.

In operation, the valve 210 provides a tailored torque (as a result of the plug assembly 240) to rotate the stem assembly 230 relative to the stem adapter 220, such as about a pivot axis defined by the rotating pin 235 (e.g., vertical rotation about a horizontal axis defined by the rotating pin 235) to control both the temperature and flow rate of water flowing through the valve 210. According to another example, the rotating pin 235 can be threaded to further influence the friction/rotational torque. The configuration of the valve 210 also allows for easy retrofitting into faucets (and other water distribution devices) that include current cartridge valves, since the overall size (e.g., outer size or package envelope) is the same as current cartridge valves. The configuration of the valve 210 can be employed with stem assemblies 230 made from polymeric materials as well as metals.

Figure 27:
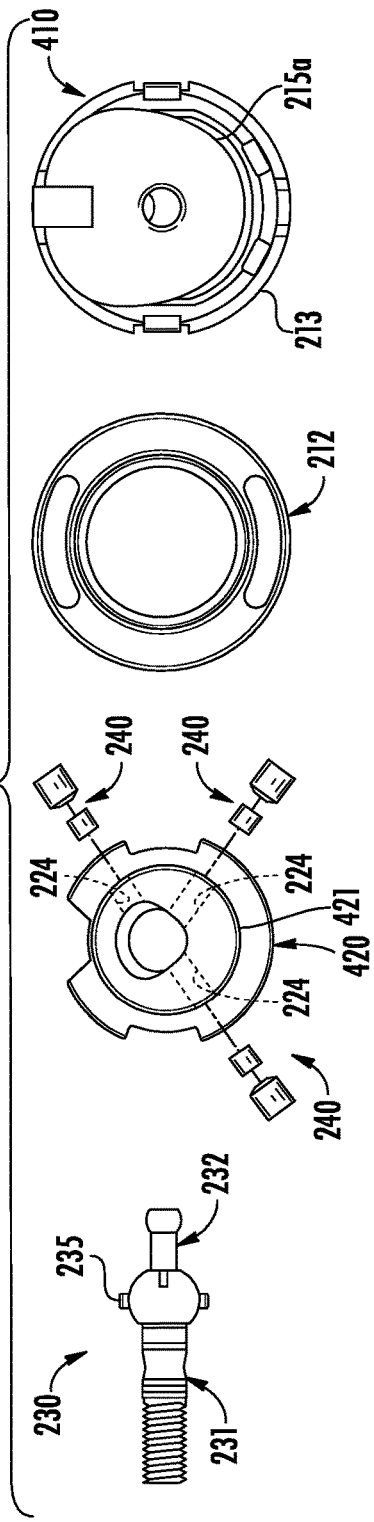
FIG. 27 is an exploded plan view of a valve according to another embodiment.

FIG. 27 illustrates an exemplary embodiment of a valve 410 that includes a housing 212, a base 213, a disk 215*a* (as well as disks 215*b* and 215*c*, not shown), a plurality of seals (e.g., gaskets 211*a*, 211*b*, not shown), a stem adapter 420, a stem assembly 230, and three plug assemblies 240. The various features of the valve 410 can be configured the same as or similar to any other valve in this disclosure, except where noted otherwise. The valve 410 may optionally include the one-piece stem 330, instead of the stem assembly 230. The stem adapter 420 can be configured the same as or similar to the stem adapter 220 described above, except where noted otherwise. For example, a body 421 of the stem adapter 420 defines three bores 224 (rather than four bores 224), with each bore 224 associated with and configured to receive at least a portion of one of the three plug assemblies 240 (rather than four plug assemblies 240). The housing 212 also includes a corresponding or the same number of through-holes 214 depending on the number of bores 224 of the body 421.

Figure 28:
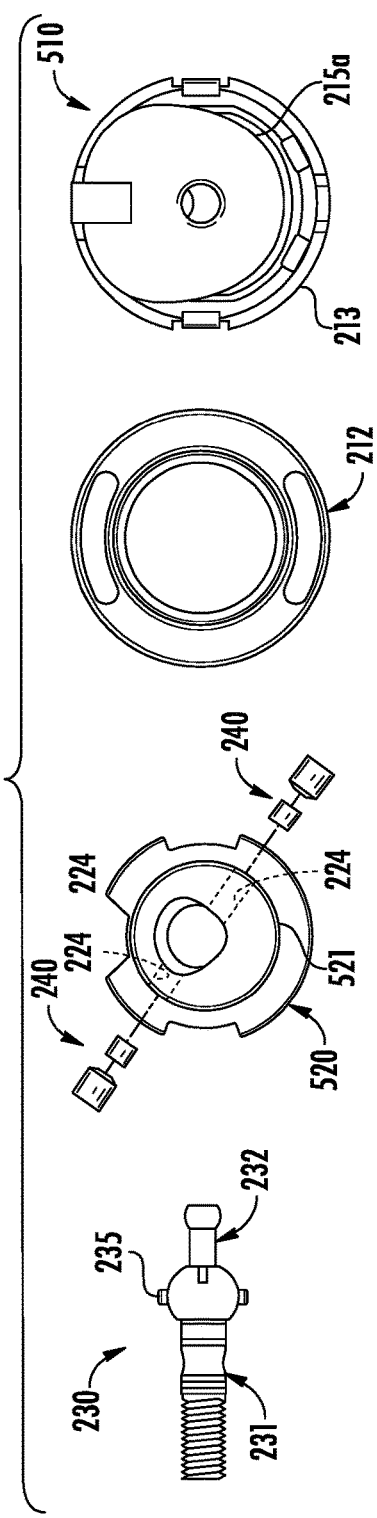
FIG. 28 is an exploded plan view of a valve according to another embodiment.

FIG. 28 illustrates another exemplary embodiments of a valves 510 that is similar to the valves 210 and 410 shown in FIGS. 26-27, respectively, except the valve 510 include two plug assemblies 240. Accordingly, the stem adapter 520 of the valve 510 includes a body 521 defining two separate bores 224, where each bore 224 receives one of the two plug assemblies 240. The various different valves 210, 410, and 510 each provide for different amounts of potential adjustment to further tailor (e.g., increase or decrease) the frictional resistance on the stem assembly 230 during rotation relative to the respective stem adapter 220, 420, and 520, respectively. The various bores 224 may be located anywhere along the respective step adapter 220, 420, 520 (for example, directly or indirectly across from each other and in a symmetrical or asymmetrical arrangement), depending on the desired configuration.

FIG. 29 and FIGS. 30-32 illustrate exemplary embodiments of a valve 610 and a valve 710, respectively, that each include a housing 612, a stem adapter assembly 620 or 720, respectively, that is received in the housing 612, the stem assembly 230 (as described further herein) for controlling operation of the valve 610 or 710, respectively, a base 613 that couples to the housing 612, a plurality of seals or gaskets 611*a*, 611*b*, and a plurality of disks 615*a*, 615*b*, 615*c* that are configured to control the flow and temperature of water through the valve 610 or 710, respectively, based on movement of the stem assembly 230 relative to the housing 612. For example, one or more of the disks can be configured to move (e.g., slide, rotate, etc.) relative to a stationary disk to change the alignment of openings in the various disks to change the flow rate and/or temperature of water flowing through the valve 610 or 710. The movement of the one or more disks is in driven by movement of the stem assembly 230. The illustrated the housing 612, the base 613, the seals 611, and the disks 615 can be configured the same as or similar to the counterpart components/elements described herein for other valves (e.g., valve 110, valve 210, etc.). The valves 610, 710 may optionally include the one-piece stem 330 (as described further herein), instead of the stem assembly 230.

As shown in FIG. 29, the stem adapter assembly 620 of the valve 610 is an integral, one-piece component that cannot be separated without destruction. The stem adapter assembly 620 includes a body 621 and a lower member 627 and defines a hole 623. The stem adapter assembly 620 (and its body 621, lower member 627, and hole 623) has a configuration that is the same as or similar to the stem adapters 120 and 220 (and the bodies 121 and 221, the lower member 127, and the first holes 123 and 223), except where noted otherwise. In particular, the body 621 does not define any holes that extend transversely through the body 621 such that adjustment of the frictional force as the stem assembly 230 moves is completely controlled by the stem assembly 230 (in particular the first stem component 231 and the second stem component 232, as described further herein).

Figure 31:
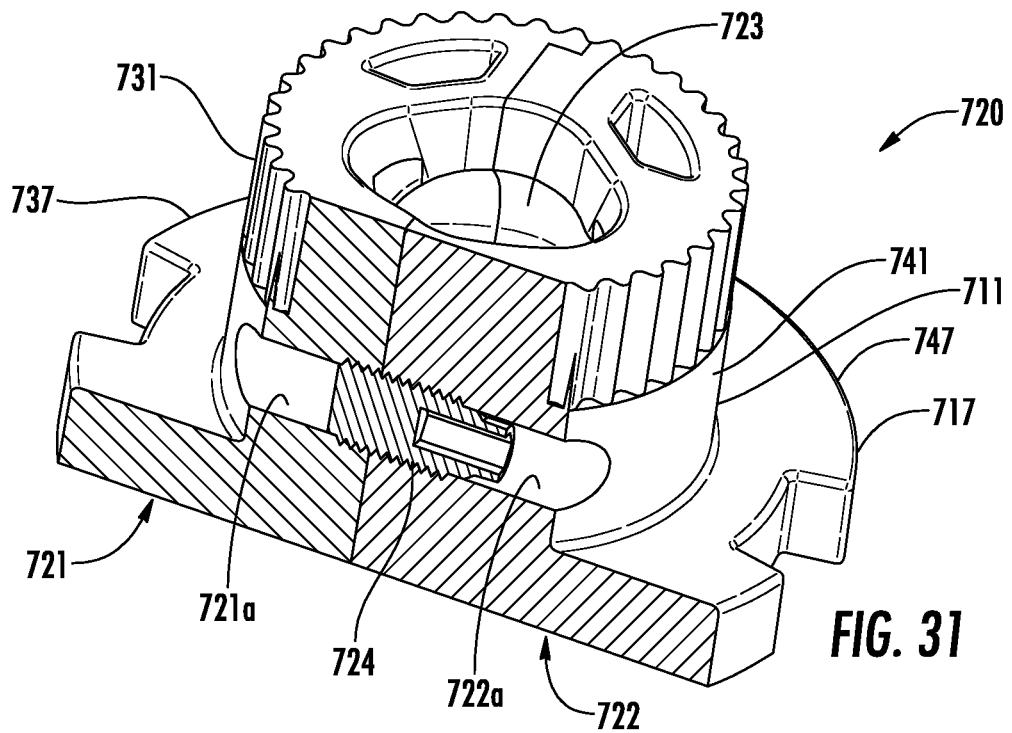
FIG. 31 is a side, cross-sectional view of a stem adapter of the valve shown in FIG. 30.
Figure 32:
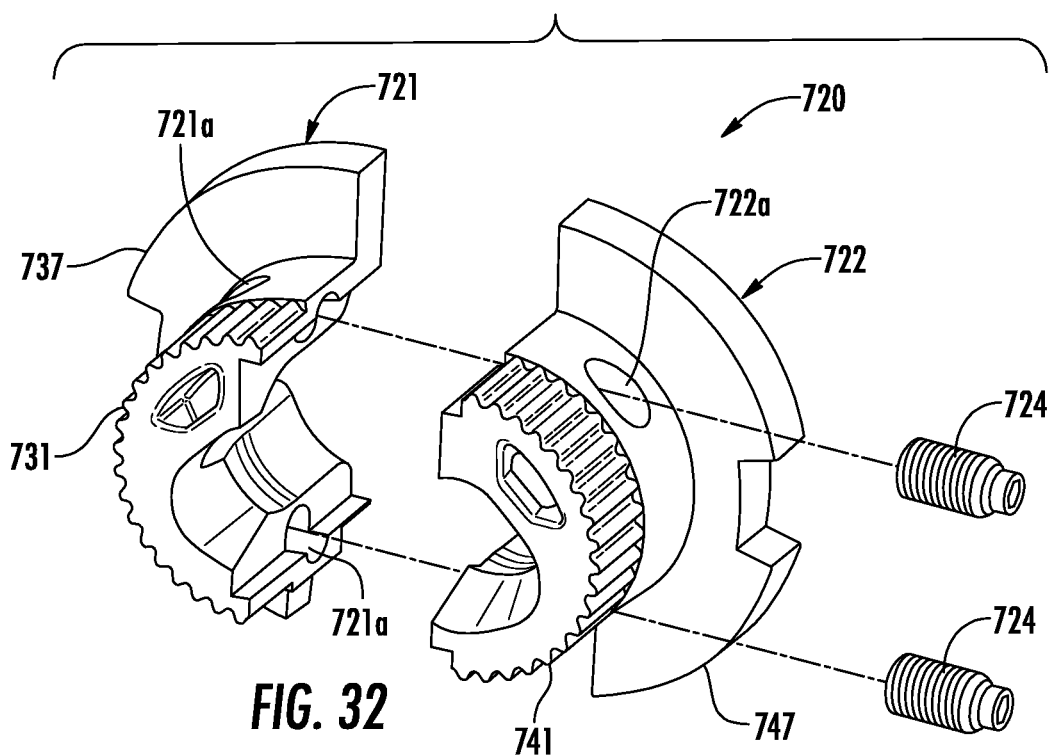
FIG. 32 is an exploded, perspective view of the stem adapter of FIG. 31.

As shown in FIGS. 30-32, the illustrated stem adapter assembly 720 of the valve 710 includes a first half or portion 721, a second half or portion 722, and at least one fastener 724 (for example, two screws, such as locking screws, set screws, etc.). The first portion 721 and the second portion 722 are attachable to each other to form the stem adapter assembly 720. The stem adapter assembly 720 further includes a body 711 (that includes and is formed by a first body portion 731 of the first portion 721 and a second body portion 741 of the second portion 722 when the portions 721, 722 are attached together). The stem adapter assembly 720 also includes a lower member 717 (that includes and is formed by a first lower member 737 of the first portion 721 and a second lower member 747 of the second portion 722 when the portions 721, 722 are attached together). The stem adapter assembly 720 (and its body 711, lower member 717, and first hole 723 (as described further herein)) has a configuration that is the same as or similar to the stem adapters 120 and 220 (and the bodies 121 and 221, the lower member 127, and the first holes 123 and 223), except where noted otherwise.

As shown in FIG. 31 (in view of FIG. 32), the fasteners 724 are configured to secure the first and second portions 721, 722 together by fastening or screwing into each of the portions 721, 722. Accordingly, each of the portions 721, 722 defines at least one attachment holes 721a, 722a, respectively, that are configured to receive the fastener 724. The attachment holes 721a, 722a are configured to align with each other into pairs for attachment of the portions 721, 722 together. Optionally, the portions 721, 722 may each have two attachment holes 721a, 722a on opposite sides of the first body portion 731 and the second body portion 741, respectively (and the stem adapter assembly 720 therefore includes two fasteners 724). Each fastener 724 extends through a pair of holes (i.e., one of the holes 721a and one of the holes 722a) to attach the portions 721, 722 together. The attachment holes 721a, 722a may optionally be threaded, and the fasteners 724 may optionally include complementary threads. Some or all of the holes 721a, 722a may extend completely through the corresponding portion 721, 722 (i.e., a through hole). According to one embodiment, one of each pair of holes 721a, 722a extends through only a portion of the corresponding portion 721, 722 (i.e., a bore with a closed end). As shown in FIG. 32, inner surfaces of each of the first and second portions 721, 722 include flanges or interlocking features in order to interlock together.

As shown in FIG. 31, when the first and second portions 721, 722 are attached together, the first and second portions 721, 722 together define at least a portion of the cavity or first hole 723 that is configured to receive the spherical portion 233 of the stem assembly 230. By tightening or loosening the fasteners 724 the frictional force or resistance between the stem assembly 230 and the stem adapter 720 can be changed. For example, the first hole 723 is configured to be varied in size upon tightening/loosening of the fasteners 724 to change the relative frictional force between the spherical portion 233 of the stem assembly 230 and the two portions 721, 722 that define the first hole 723. In this way, tightening of the fasteners 724 decreases the size (e.g., radius) of the first hole 723 from a clearance fit to an interference fit between the spherical portion 233 and the two portions 721, 722 to increase the compression and frictional forces on the spherical portion 233 (and vice versa), and thus to set the correct torque for the valve 710.

It is noted that the valves 610 and 710 can include fewer elements or additional elements to those described herein, and the specific configuration of the elements can be different than that shown and described.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the valves and valve components/elements, as shown in the various exemplary embodiments, are illustrative only. Additionally, any element disclosed in one embodiment may be incorporated or utilized with any other embodiment disclosed herein. For example, each stem (e.g., stem assembly), stem adapter, screw, O-ring, plug (e.g., plug assembly) described herein may be incorporated into any other embodiment of this disclosure. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A cartridge valve for a faucet, comprising:
   a housing;
   a stem adapter configured to be at least partially received in the housing and comprising a body defining a first hole, which extends in a longitudinal direction; and
   a stem assembly comprising:

a first stem component comprising an arm and a spherical portion that is configured to be at least partially positioned within the first hole and defines an opening; and a second stem component comprising a body that is configured to be at least partially received within the opening of the first stem component;

wherein the spherical portion is configured to expand in size in response to inserting a portion of the body of the second stem component into the opening in the first stem component, which increases a frictional resistance induced by relative rotation between the stem assembly and the stem adapter.

2. The cartridge valve of claim 1, wherein the spherical portion is configured to expand diametrically from a clearance fit into an interference fit with the body of the stem adapter in response to the second stem component being inserted further into the opening of the first stem component.

3. The cartridge valve of claim 2, wherein the body includes a slit, such that the body expands in size in response to the spherical portion expanding diametrically to increase a friction resistance induced by relative rotation between the stem adapter and the housing.

4. The cartridge valve of claim 1, wherein the first stem component comprises at least one slit configured to allow the spherical portion to expand in size.

5. The cartridge valve of claim 1, wherein the second stem component is configured to drive movement of another component within the cartridge valve in response to movement of the stem assembly relative to the stem adapter.

6. The cartridge valve of claim 1, wherein the stem adapter defines a second hole, extending in a radial direction, and wherein the stem assembly comprises a rotating pin that extends from the spherical portion and is configured to be partially received in the second hole of the stem adapter.

7. The cartridge valve of claim 1, wherein the stem adapter comprises a first portion and a second portion that are attachable to each other with at least one fastener, and wherein, by tightening or loosening the fastener, the frictional resistance can be changed.

8. A cartridge valve for a faucet, comprising:
a housing;
a stem adapter configured to be at least partially received in the housing and comprising a body defining a hole extending in a longitudinal direction and a bore extending in a radial direction;
a stem assembly comprising an arm and a spherical portion that is configured to be at least partially positioned within the hole; and
a plug assembly comprising:
a plug configured to be located in the bore proximate the stem assembly; and
a screw configured to be threaded in the bore and configured to compress the plug against the stem assembly in response to tightening the screw to increase a normal force between the plug and the stem assembly.

9. The cartridge valve of claim 8, wherein further tightening of the screw further increases the normal force, and wherein loosening the screw reduces the normal force.

10. The cartridge valve of claim 9, further comprising a plurality of plug assemblies that comprises the plug assembly, wherein the body defines a plurality of bores that comprises the bore for each of the plurality of plug assemblies.

11. The cartridge valve of claim 10, wherein each of the plurality of plug assemblies is independently adjustable relative to any other plug assembly of the plurality of plug assemblies.

12. The cartridge valve of claim 8, wherein the plug is located proximate the spherical portion of the stem assembly, and wherein the plug is configured to be compressed against the spherical portion by the screw.

13. The cartridge valve of claim 8, wherein the screw is configured to retract the plug against the stem assembly in response to loosening the screw to decrease the normal force between the plug and the stem assembly.

14. A cartridge valve for a faucet, comprising:
a housing;
a stem adapter configured to be at least partially received in the housing and comprising a body defining a first hole, which extends in a longitudinal direction; and
a stem assembly at least partially received in the first hole and defining a second hole therethough, the stem assembly comprising:
a first stem component comprising an arm and a spherical portion that is configured to be at least partially positioned within the first hole and defines an opening; and
a second stem component comprising a body that is configured to be at least partially received within the opening of the first stem component;
wherein the spherical portion is diametrically repositionable from a clearance fit and an interference fit within the body of the stem adapter.

15. The cartridge valve of claim 14, wherein the stem adapter defines a second hole, extending in a radial direction, and wherein the stem assembly comprises a rotating pin that extends from the spherical portion and is configured to be partially received in the second hole of the stem adapter.

16. The cartridge valve of claim 14, wherein the spherical portion expands from the clearance fit to the interference fit within the body of the stem adapter in response to the body of the second stem adapter being inserted into the opening from the first position to the second position.

17. The cartridge valve of claim 14, wherein the spherical portion retracts from the interference fit to the clearance fit within the body of the stem adapter in response to the body being removed from the opening of the first stem component from the second position to the first position.

18. The cartridge valve of claim 14, further comprising a plug assembly comprising:
a screw configured to engage and disengage the plug against the stem assembly in response to repositioning the screw to control a normal force between the plug and the stem assembly; and
a plug positioned between the screw and the spherical portion.

19. The cartridge valve of claim 18, wherein the plug engages the stem assembly when the screw is tightened to increase a normal force between the plug and the stem assembly.

20. The cartridge valve of claim 18, wherein the plug disengages the stem assembly when the screw is loosened to decrease a normal force between the plug and the stem assembly.

* * * * *